United States Patent [19]

Tamiya et al.

[11] Patent Number: 4,981,349

[45] Date of Patent: Jan. 1, 1991

[54] REARVIEW MIRROR ASSEMBLY FOR AUTOMOBILES INCLUDING POSITIONING MEANS WITH A RECESS SURFACE EXTENDING UNIFORMLY HORIZONTALLY

[75] Inventors: Manabu Tamiya; Hideo Koiwai; Masaharu Tsuruoka; Koji Machida, all of Saitama, Japan

[73] Assignee: Kabushiki Kaisha Matsuyama Seisakusho, Tokyo, Japan

[21] Appl. No.: 429,454

[22] Filed: Oct. 31, 1989

[30] Foreign Application Priority Data

| Sep. 1, 1989 | [JP] | Japan | 1-103352 |
| Sep. 1, 1989 | [JP] | Japan | 1-103353 |
| Sep. 1, 1989 | [JP] | Japan | 1-103354 |

[51] Int. Cl.$^5$ .......................... B60R 1/06; G02B 7/18
[52] U.S. Cl. ..................................... 350/632; 350/637
[58] Field of Search .................... 350/637, 632, 604; 248/478, 477, 549, 900

[56] References Cited

U.S. PATENT DOCUMENTS

4,626,083 12/1986 Nakayama et al. ............... 350/604
4,626,084 12/1986 Kumai ............................. 350/604

FOREIGN PATENT DOCUMENTS

| 166378 | 1/1986 | European Pat. Off. ............ 350/637 |
| 60-29743 | 2/1985 | Japan . |
| 60-37450 | 3/1985 | Japan . |
| 179351 | 9/1985 | Japan ............................. 350/637 |
| 61-26651 | 2/1986 | Japan . |
| 61-82848 | 5/1986 | Japan . |
| 61-110638 | 5/1986 | Japan . |
| 61-125851 | 8/1986 | Japan . |
| 191447 | 8/1986 | Japan ............................. 350/637 |
| 62-74051 | 5/1987 | Japan . |
| 62-94946 | 6/1987 | Japan . |
| 63-23158 | 2/1988 | Japan . |
| 173745 | 7/1988 | Japan ............................. 350/637 |
| 63-173745 | 7/1988 | Japan . |
| 63-130348 | 8/1988 | Japan . |
| 64-22646 | 1/1989 | Japan . |

*Primary Examiner*—Jon W. Henry
*Attorney, Agent, or Firm*—Irving M. Weiner; Joseph P. Carrier; Pamela S. Burt

[57] ABSTRACT

A rearview mirror assembly for an automobile includes a base adapted to be mounted on an automobile body and having a substantially vertical support shaft, a rotatable bracket mounted on the base and having a mirror and an electric motor, the rotatable bracket being angularly movable about the support shaft between a normal position and a rearwardly tilted position in response to energization of the motor, and a positioning mechanism for positioning the rotatable bracket in the normal position and the rearwardly tilted position one at a time. The positioning mechanism comprises a plurality of balls partly fitted in a plurality of recesses defined in the base and a plurality of semispherical recesses defined in the rotatable bracket. The recesses of the base have horizontal surfaces. When the rearview mirror assembly moves between the normal position and the rearwardly tilted position, the balls engage only the horizontal surfaces of the recesses of the base. Therefore, the load on the motor remains constant while the rearview mirror assembly is being turned. When the balls leave one end of the recesses of the base and reach the other ends thereof, a change in the load on the motor is detected by a sensor, and a detected signal is applied to a controller which de-energizes the motor. Rather than such a sensor, a limit switch for detecting the position of a mirror housing may be used to de-energize the motor.

10 Claims, 30 Drawing Sheets

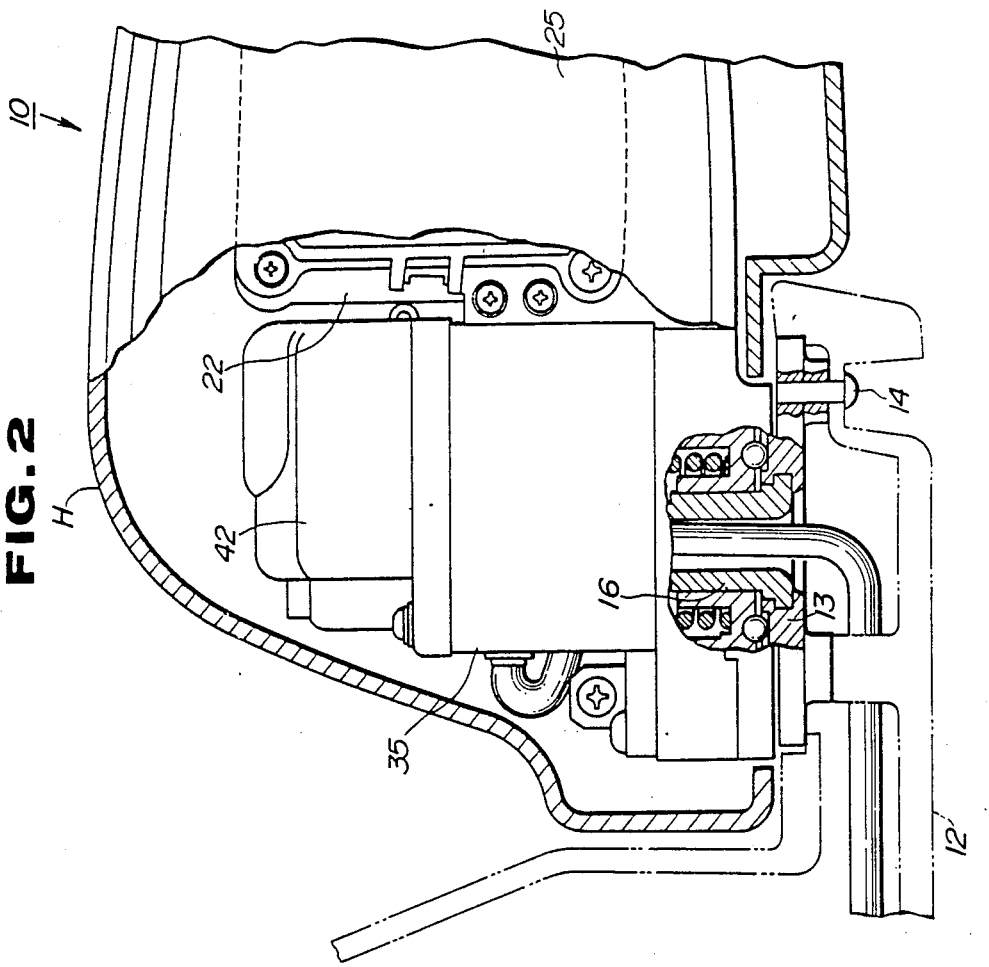
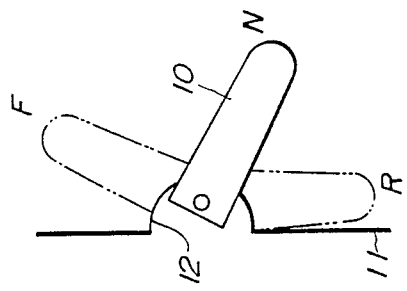

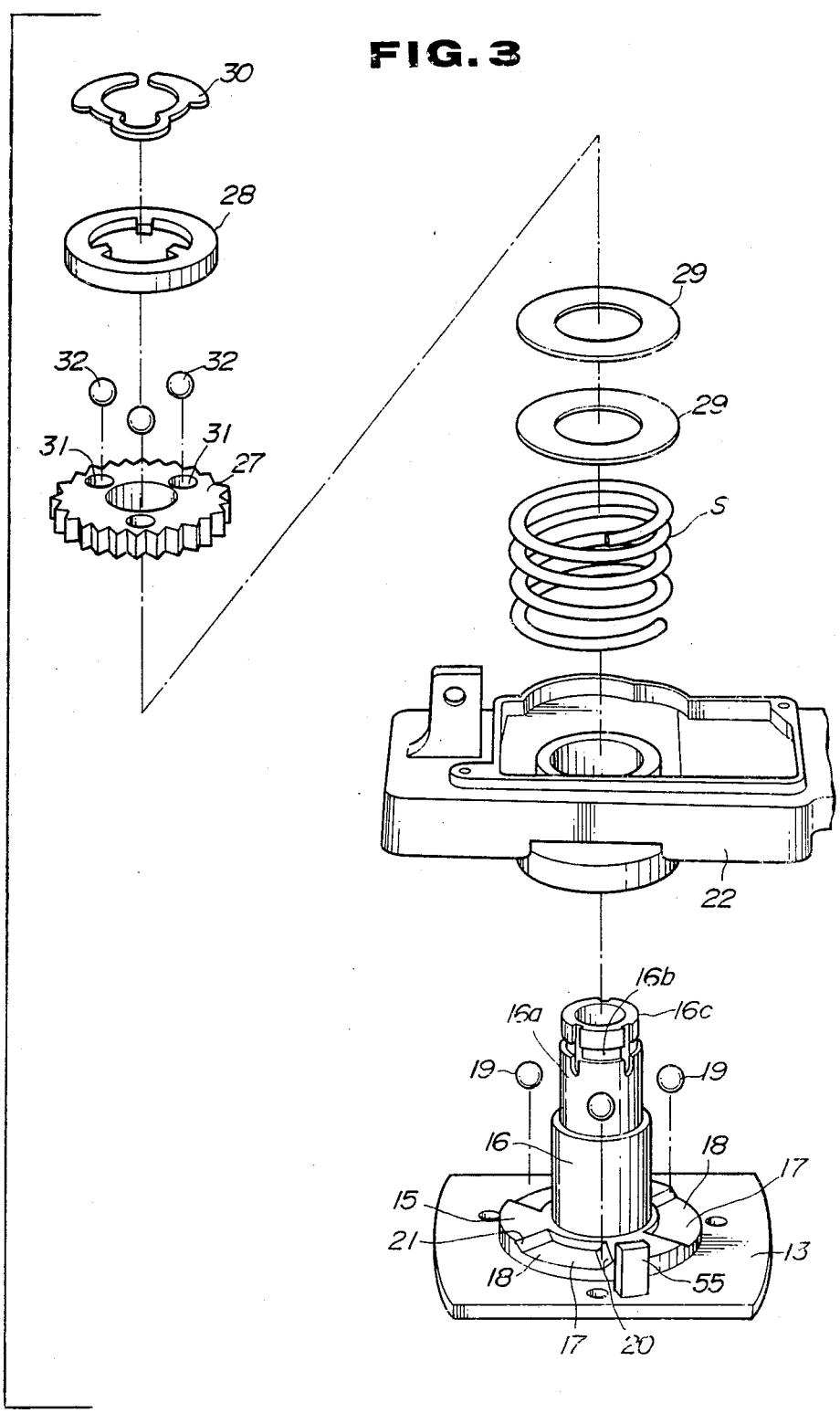

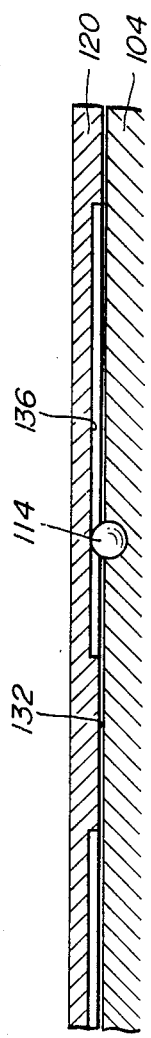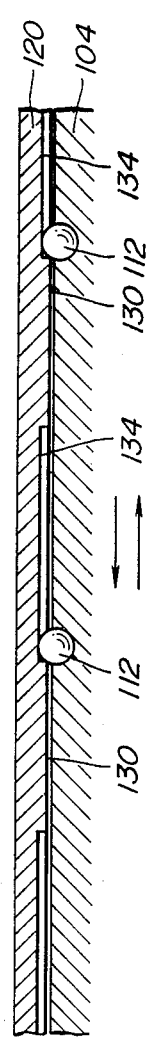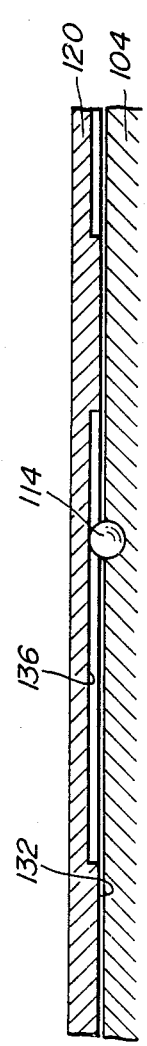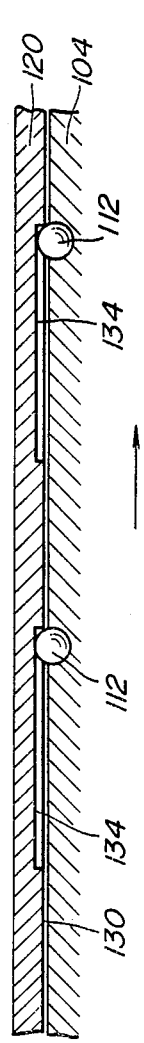
FIG.14A
FIG.14B
FIG.16A
FIG.16B

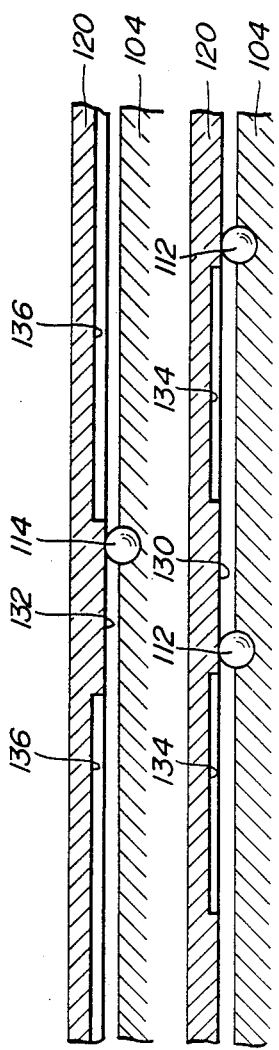
FIG.18A
FIG.18B
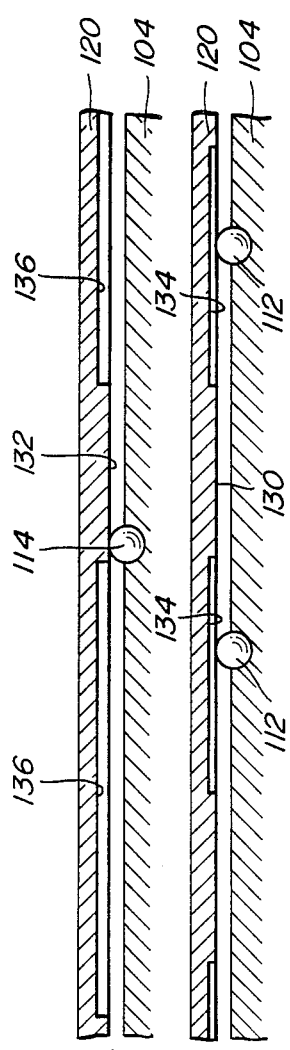
FIG.20A
FIG.20B
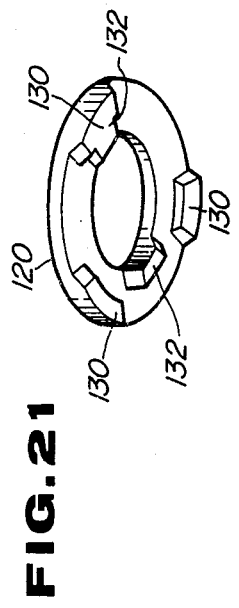
FIG.21

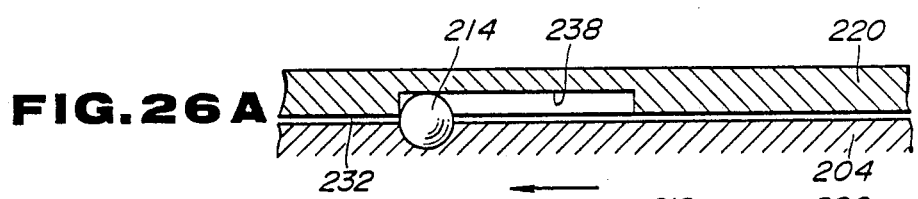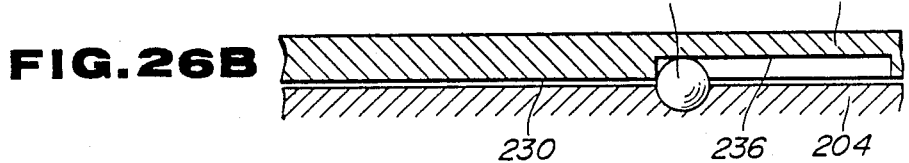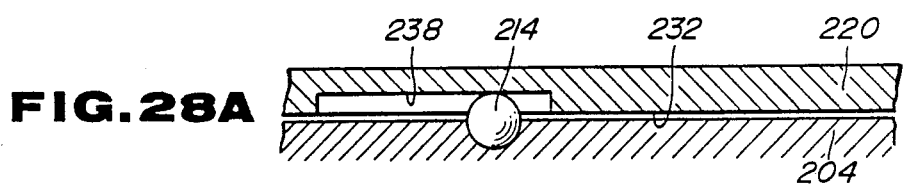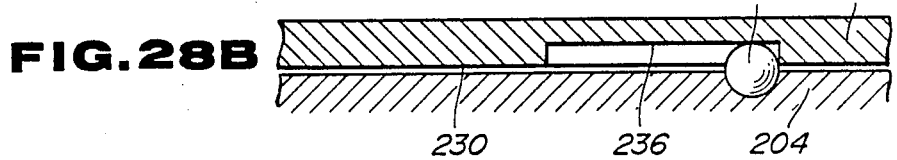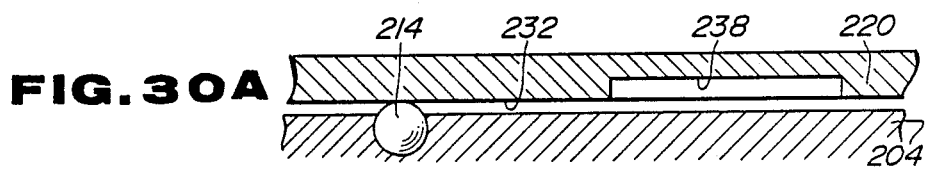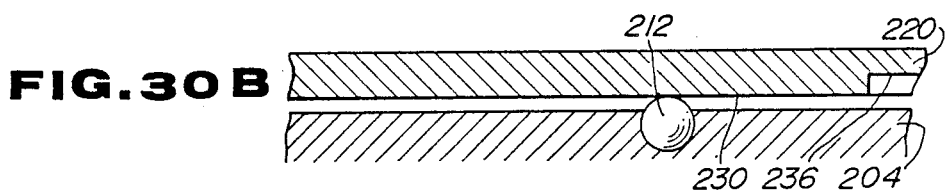

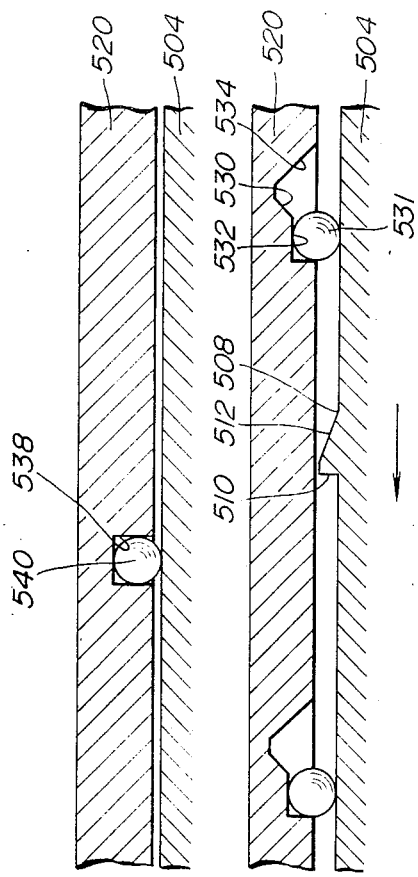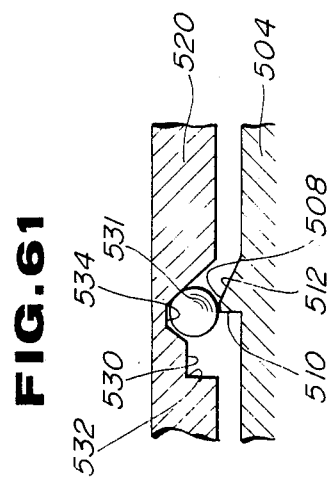
FIG.60A
FIG.60B
FIG.61

REARVIEW MIRROR ASSEMBLY FOR AUTOMOBILES INCLUDING POSITIONING MEANS WITH A RECESS SURFACE EXTENDING UNIFORMLY HORIZONTALLY

BACKGROUND OF THE INVENTION

1. Field of the Invention:

The present invention relates to an automotive rearview mirror assembly having a remotely controlled tiltable mirror.

2. Description of the Relevant Art:

Japanese Laid-Open Utility Model Publication No. 61(1986)-26651 shows a remotely controlled automotive rearview mirror assembly including a mirror which is angularly movable to and fro about a substantially vertical shaft with respect to an automobile on which the rearview mirror assembly is mounted. More specifically, the rearview mirror assembly comprises a base fixed to a door of the automobile, a housing angularly movably supported on the base and housing the mirror, and an electric motor disposed in the housing and energizable to actuate the housing. When the automobile is to be parked in a small space, the rearview mirror assembly can be folded rearwardly or turned toward the door so as to reduce the overall width of the automobile. When the rearview mirror assembly is subjected to a shock from behind, it is tilted forwardly to absorb the shock. The housing is positioned in normal and rearwardly tilted positions by a relatively shallow circumferential groove defined in the base, a pair of recesses defined in the base at the opposite ends of the groove and deeper than the groove, and a single ball movably riding in the groove. When the housing is in the normal position, the ball engages in one of the recesses. When the motor is energized to start turning the housing, the ball is moved out of the recess, in and along the groove, and then into the other recess. When the ball engages in the other recess, the housing is positioned in the rearwardly tilted position. The housing can be moved back from the rearwardly tilted position to the normal position in a similar manner.

The conventional remotely controlled rearview mirror assembly is however disadvantageous in that a large force is required to move the ball out of the recesses, large uncomfortable noise is sometimes produced by the motor depending on the load on the motor, and the housing tends to move up and down.

SUMMARY OF THE INVENTION

It is an object of the present invention to provide a remotely controlled automotive rearview mirror assembly which minimizes fluctuations or variations in the load on an electric motor thereof, so that the motor will not produce large noise and will operate stably.

According to the present invention, a rearview mirror assembly for an automobile comprises a base adapted to be mounted on an automobile body and having a support shaft, a rotatable member mounted on the base and having a mirror and an actuator, the rotatable member being angularly movable about the support shaft between a normal position and a rearwardly tilted position by at least the actuator, and means for positioning the rotatable member in the normal position and the rearwardly tilted position one at a time. The positioning means comprises a projection and a recess having a surface for engaging the projection, the surface of the recess comprising a surface which extends horizontally the projection is moving between one end of the recess and the other end of the recess in response to angular movement of the rotatable member between the normal position and the rearwardly tilted position. Since the projection, which may be a plurality of balls, partly engages only the horizontal surface of the recess, no excessive load is applied to the motor when the rearview mirror assembly starts being tilted from the normal position to the rearwardly tilted position or returns from the rearwardly tilted position to the normal position. When the projection is displaced from one end of the recess and reaches the other end thereof, a change in the load on the motor is detected by a sensor, and a detected signal is applied to a controller which de-energizes the motor.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a schematic plan view showing positions into which a rearview mirror assembly of the present invention is tiltable:

FIG. 2 is a fragmentary front elevational view. partly out away, of the rearview mirror assembly;

FIG. 3 is an exploded perspective vie of the rearview mirror assembly;

FIGS. 14A and 14B are developed cross-sectional views of the positioning means shown in FIG. 13;

FIGS. 16A and 16B are developed cross-sectional views of the positioning means shown in FIG. 15;

FIGS. 18A and 18B are developed cross-sectional views of the positioning means shown in FIG. 17;

FIGS. 20A and 20B are developed cross-sectional views of the positioning means shown in FIG. 19;

FIG. 21 is a perspective view of a modification of the ring illustrated in FIG. 12;

FIGS. 26A and 26B are developed cross-sectional views of the positioning means shown in FIG. 25;

FIGS. 28A and 28B are developed cross-sectional views of the positioning means shown in FIG. 27;

FIGS. 30A and 30B are developed cross-sectional views of the positioning means shown in FIG. 29;

FIGS. 58A and 58B are developed cross-sectional views of the positioning means shown in FIG. 57;

FIGS. 60A and 60B are developed cross-sectional views of the positioning means shown in FIG. 59; and FIG. 61 is a fragmentary cross-sectional view showing the condition in which a ball rides on a tooth.

DETAILED DESCRIPTION OF THE PREFERRED EMBODIMENTS

As shown in FIG. 1, a rearview mirror assembly 10 according to the present invention is normally inclined a prescribed angle rearwardly from a horizontal line extending perpendicularly to the longitudinal axis of an automobile, as indicated by the solid lines. At this time, the rearview mirror assembly 10 is in a normal position N. The rearview mirror assembly 10 is tiltable about 60 degrees from the normal position N rearwardly with respect to the automobile into a rearwardly tilted position R in which the rearview mirror assembly 10 is positioned closely to a door 11 of the automobile as indicated by the broken lines. The rearview mirror assembly 10 is also tiltable about 80 degrees forwardly from the normal position N into a forwardly tilted position F.

Figure 4:
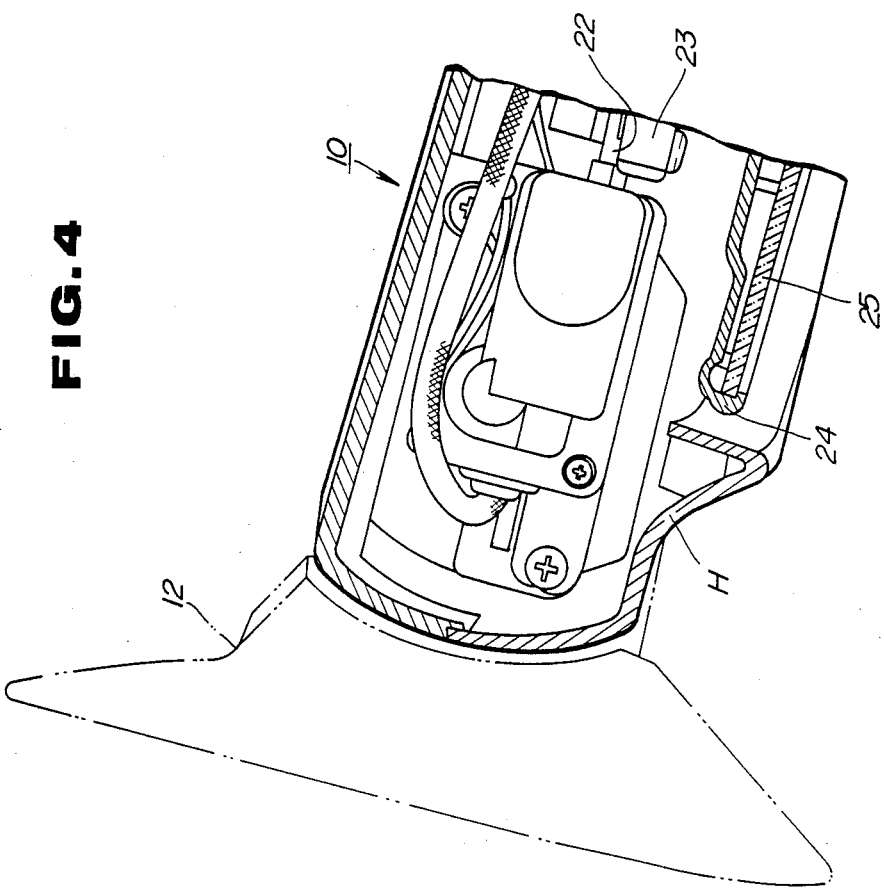
FIG. 4 is a fragmentary plan view of an internal mechanism of the rearview mirror assembly.

A support or mount 12 is fixed to the door 11, and a base 13 (FIG. 2) is attached to the mount 12 by bolts 14. As shown in FIG. 3 in greater detail, the base 13 supports, integrally thereon, a circular boss 15 and a support shaft 16 vertically mounted centrally on the boss 15, the support shaft 16 being in the form of a tubular fixed shaft. The boss 15 has three circumferentially spaced sectorial recesses 17 defined in its upper surface. When the rearview mirror assembly 10 is angularly moved from a normal position N to a rearwardly inclined position R, as described later on, a ball 19 moves on a horizontal surface 18 of each of the recesses 17 from one slanted surface 20 toward the other slanted surface 21. A bracket 22 is angularly movably fitted over the support shaft 16. As shown in FIG. 4, the bracket 22 has a mirror actuator unit 23. When the mirror actuator unit 23 is operated, a mirror holder 24 supporting a mirror 25 is tilted up and down and also left and right. A mirror housing H is mounted on the bracket 22, and all components of the rearview mirror assembly 10 are housed in the mirror housing H.

Figure 5:
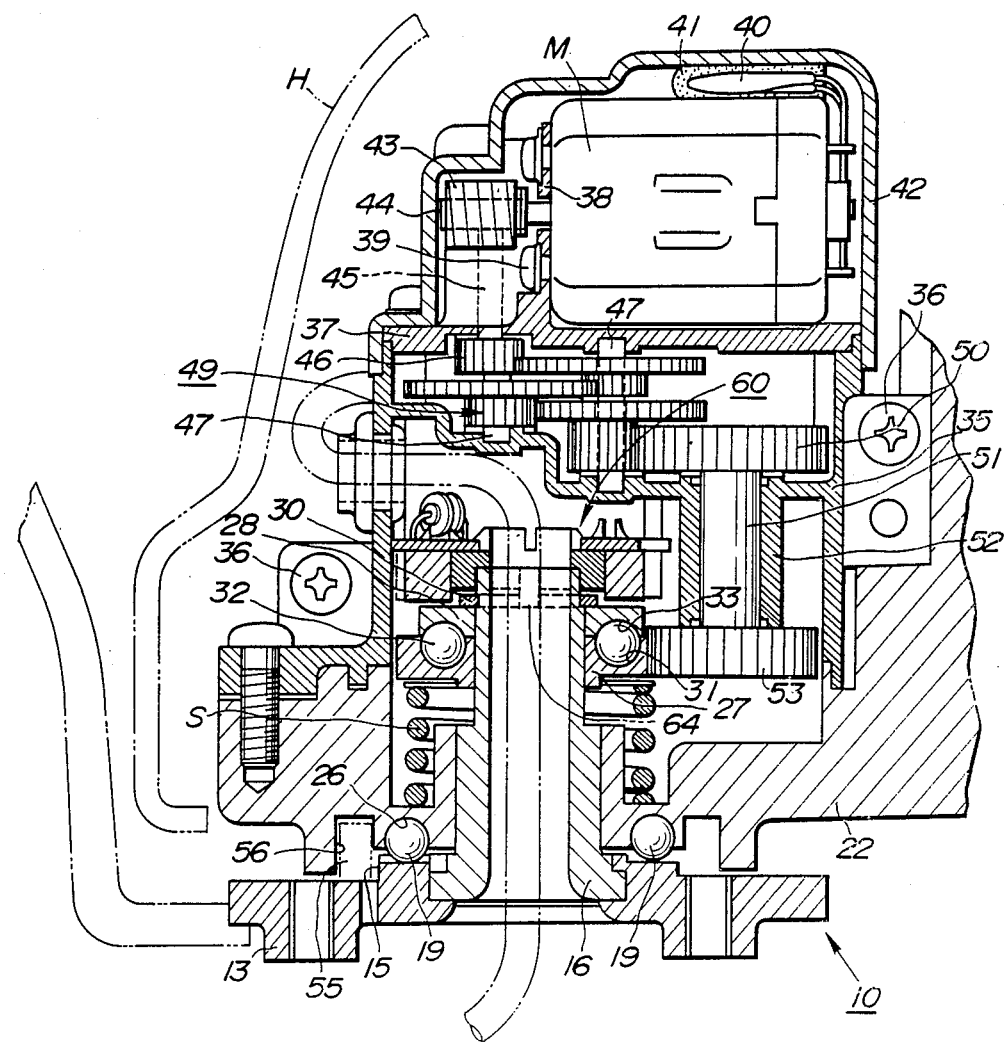
FIG. 5 is a cross-sectional view of the internal mechanism.
Figure 6:
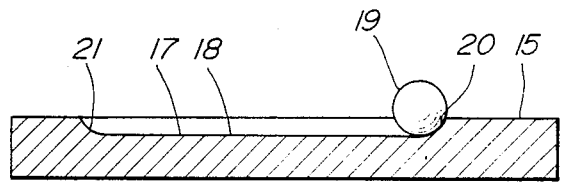
FIG. 6 is a cross-sectional view showing the relationship between a base and a ball when the rearview mirror assembly is in a normal position.
Figure 7:
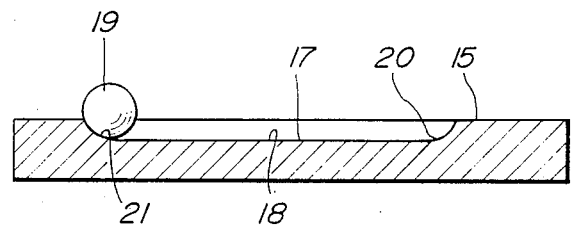
FIG. 7 is a view similar to FIG. 6, showing the relationship between the base and the ball when the rearview mirror assembly is in a rearwardly tilted position.

As shown in FIGS. 3 and 5, the bracket 22 has three semispherical recesses 26 defined in the lower surface thereof which faces the boss 15 of the base 13. The balls 19 engage respectively in the recesses 26. The balls 19 received in the recesses 26 partly project out of the recesses 26 and serve as projections. A spring S is placed on the upper surface of the bracket 22 which is fitted over the support shaft 16. The support shaft 16 has a smaller-diameter upper portion 16a. A gear 27 is positioned on the spring S with two washers 29 interposed therebetween, and is rotatably fitted over the smaller-diameter portion 16a. A ring 28 mounted on the gear 27 is splined to the smaller-diameter portion 16a. The ring 28 is held in position on the smaller-diameter portion 16a by a retaining ring 30 fitted in a circumferential slot 26b defined in the upper end of the support shaft 16. Since the balls 19 are biased to move downwardly under the forces of the spring S, the balls 19 are reliably held in engagement with the base 13. The gear 27 has three semispherical recesses 31 defined in the upper surface thereof, and at least halves of balls 32 are received respectively in the recesses 31. The ring 28 also has six recesses 33, i.e., a number of recesses 33 which are twice the number of the recesses 31, defined in the lower surface of the ring 28. The balls 32 are partly received in three out of these six recesses 33. When the rearview mirror assembly 10 is in the normal position N, the gear 27 is not rotated as it is urged toward the ring 28 by the spring S.

As best shown in FIG. 5, a gear case 35 is fixed to the bracket 22 by a plurality of bolts 36 and has its upper opening closed off by a horizontal plate 37. To the horizontal plate 37, there is joined a vertical plate 38 with an electric motor M fixed thereto by bolts 39, the motor M being placed on the horizontal plate 37. A thermistor 40 protected by a sponge member 41 is attached to the motor M, the thermistor 40 serving to prevent an excessive current from flowing through the motor M. The motor M is covered by a cover 42 attached to the upper end of the gear case 35. The motor M has an output shaft on which there is mounted a worm 43 held in mesh with a worm wheel 44 fixedly mounted on the upper end of a vertical shaft 45 rotatably supported on the horizontal plate 37. A gear 46 is fixed to the lower end of the vertical shaft 45. Rotation of the gear 46 is transmitted to a gear 50 while being reduced in speed by a train of gears 49 fixedly mounted on a plurality of vertical shafts 47 rotatably supported in the gear case 35. The gear 50 is mounted on the upper end of a rotatable large-diameter vertical shaft 51 supported in a tubular portion 52 extending downwardly from the lower surface of the gear case 35. A gear 53 fixed to the lower end of the vertical shaft 51 is in mesh with the gear 27.

Since the gear 27 is held against the ring 28 under the upward bias of the spring S, the gear 27 remains fixed to the fixed support shaft 16. Therefore, the gear 53 which starts being rotated by the motor M revolves around the gear 27 while rotating about its own axis. As the gear 53 thus revolves around the gear 27, the bracket 22, i.e., the rearview mirror assembly 10 rotates in its entirety about the support shaft 16. When the bracket 22 rotates clockwise to move the rearview mirror assembly 10 from the normal position to the rearwardly tilted position R, the balls 19 move on the horizontal surfaces 18 of the recesses 17 from the slanted surfaces 20 to the slanted surfaces 21. When the gear 53 starts to rotate counterclockwise, i.e., when the rearview mirror assembly 10 is moved back from the rearwardly tilted position R to the normal position N, the balls 19 move on the horizontal surfaces 18 from the slanted surfaces 21 to the slanted surfaces 20. Since the balls 19 move on only the horizontal surfaces 18, the drive force produced by the motor M may be constant, and no excessive load will be applied to the motor M. The worm 43 and the worm wheel 44 are stopped while imposing a load on the gears 49 which comprise spur gears, thus eliminating the backlashes of the gears 49. Therefore, once the balls 19 are engaged by one of the slanted surfaces 20, 21, they do not return from the stopped position toward the other slanted surfaces. Accordingly, the rearview mirror assembly 10 is reliably kept in the normal position N or the rearwardly tilted position R.

When the mirror housing H is stopped during its tilting movement, i.e., the gear 53 is stopped, due to contact by an obstacle, the motor M remains energized but does not rotate its output shaft. If such a condition continues, the motor M is subjected to a high load. According to the illustrated embodiment, when such an excessive load is imposed, the gear 27 is rotated by the rotation of the gear 53 about its own axis, so that the balls 32 are forced out of the recesses 33 of the ring 28 whereupon the gear 27 becomes freely rotatable about the support shaft 16. The rotation of the gear 27 prevents the motor M from being excessively loaded. The maximum torque of the motor M is selected to be larger than a force for disengaging the gear 27 and the ring 28 of the excessive load prevention clutch which comprises the gear 27, the balls 32, the ring 28, and the spring S.

A stopper 55 (FIG. 3) is vertically disposed on the base 13 and extends partly along the circumferential edge of the boss 15. When the rearview mirror assembly 10 reaches the rearwardly tilted position R or the forwardly tilted position F, the stopper 55 abuts against one of the ends of a groove 56 (FIG. 5) defined in the lower surface of the bracket 22 and extending circumferentially. Therefore, the rearview mirror assembly 10 will not be excessively tilted beyond the rearwardly and forwardly tilted positions R, F.

When a relatively large external force is applied to the rearview mirror assembly 10 from behind, the balls 19 ride onto the upper surface of the boss 15 against the resiliency of the spring S, slightly lifting the bracket 22 as a whole. While the rearview mirror assembly 10 is moving toward the forwardly tilted position F, the balls 19 drop into the adjacent recesses 17. When the rearview mirror assembly 10 returns rearwardly from the forwardly tilted position F, the balls 19 ride onto the upper surface of the boss 15 again and then engage into the previous recesses 17.

Figure 8:
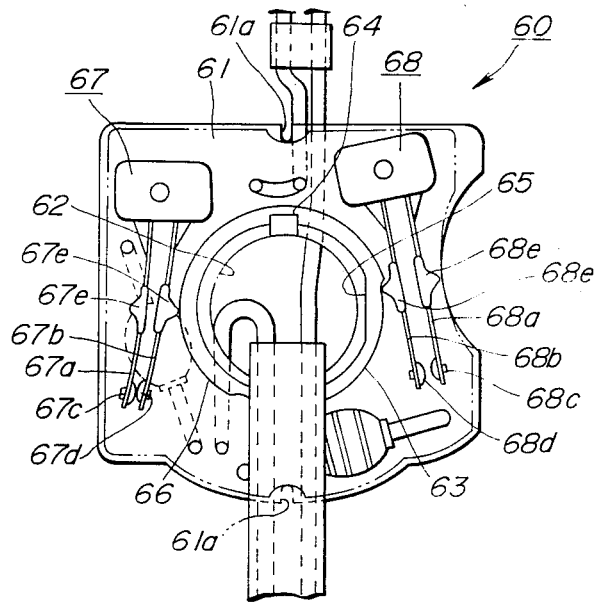
FIG. 8 is a bottom view of a tilting movement control mechanism.

FIG. 8 shows in detail a tilting movement control mechanism 60 for automatically de-energizing the motor M when the rearview mirror assembly 10 reaches the rearwardly tilted position R from the normal position N or reaches the normal position N from the rearwardly tilted position R. The tilting movement control mechanism 60 has a substantially rectangular base plate 61 nonrotatably housed in the gear case 35. The base plate 61 is positioned by pins (not shown) in the gear case 35 which engage in respective slender slots 61a defined in two opposite sides of the base plate 61. The base plate 61 has a central opening 62 in which a tubular body 63 is mounted nonrotatably with respect to the base plate 61. The tubular body 63 has a lower end nonrotatably fitted over the upper end of the support shaft 16. The tubular body 63 has a downwardly projecting tongue 64 passing through a gap in the retaining ring 30 (FIG. 3). The tongue 64 has a finger (not shown) on its lower end which engages in the circumferential groove 16b of the support shaft 16. The tubular body 63 has a flat inner circumferential surface 65 engaging a flat surface 16c on the upper end of the support shaft 16. Therefore, when the rearview mirror assembly 10 is tilted, the base plate 61 is angularly moved with respect to the tubular body 63.

The tubular body 63 has a cam edge 66 as a radially outward circumferential edge. The cam edge 66 is associated with cam switches 67, 68 mounted on the base plate 61 on opposite sides of the tubular body 63, the cam switches 67, 68 being electrically connected to the motor M. The cam switch 67 has two arms 67a, 67b, the arm 67a having a fixed contact 67c on its distal end and the arm 67b having a movaport contact members 67e respectively on their intermediate portions. When the base plate 61 is turned counterclockwise in FIG. 8 about the support shaft 16, i.e., the tubular body 63, the arm 67b is moved away from the arm 67a, displacing the movable contact 67d out of contact with the fixed contact 67c whereupon the cam switch 67 is turned off. When the base plate 61 is turned back clockwise from this position, the arm 67b is brought into contact with the cam edge 66 again to force the movable contact 67d to contact the fixed contact 67c, whereupon the cam switch 67 is turned on. Likewise, the other cam switch 68 has two arms 68a, 68b which have movable and fixed contacts 68c, 68d respectively on their distal ends, and contact members 68e respectively on their intermediate portions. The cam switch 68 operates in the same manner as the cam switch 67.

The cam switches 67, 68 are positioned as shown in FIG. 8 when the rearview mirror assembly 10 is in the normal position N. When the motor M is energized to tilt the rearview mirror assembly 10 rearwardly from the normal position N, the base plate 61 starts to rotate counterclockwise, and at the same time the balls 19 start to move from the slanted surfaces 20 over the horizontal surfaces 18 toward the slanted surfaces 21. When the rearview mirror assembly 10 is turned about 60 degrees and reaches the rearwardly tilted position R, the cam switch 67 is turned off as described above, and the motor M is automatically de-energized. When the motor M is energized again to return the rearview mirror assembly 10 from the rearwardly tilted position R to the normal position N, the cam switch 68 is turned off when the rearview mirror assembly 10 has turned about 60 degrees. The rearview mirror assembly 10 is now stopped in the normal position N and the motor M is de-energized.

The positioning means may alternatively comprise three semispherical recesses 26 defined in the base 13, balls 19 fitted respectively in the recesses 26, and sectorial recesses 17 defined in the lower surface of the bracket 22 at circumferentially equally spaced intervals.

Rearview mirror assemblies according to other embodiments of the present invention will be described below. These other rearview mirror assemblies are different from the rearview mirror assembly of the preceding embodiment only as to the structure of the positioning means and the motor de-energizing structure. Therefore, only the positioning means and the motor de-energizing structure will be described below. Like or corresponding parts are denoted by like or corresponding reference numerals.

FIGS. 9 through 20 show a rearview mirror assembly 100 according to a second embodiment of the present invention. The rearview mirror assembly 100 has a positioning means 101 including a base 102. The base 102 supports, integrally thereon, a circular boss 104 and a support shaft 106 vertically mounted centrally on the boss 104, the support shaft 106 being in the form of a tubular fixed shaft. The boss 104 has three semispherical recesses 108 defined in its upper surface and circumferentially equally spaced at 120 degrees near the peripheral edge of the boss 104, and two semispherical recesses 110 defined in its upper surface radially inwardly of the recesses 108 and positioned in diametrically opposite relation to each other. Balls 112, 114 are partly received respectively in these recesses 108, 110, and have exposed portions serving as projections. The balls 112, 114 do not move out of the recesses 108, 110 when the rearview mirror assembly 100 is turned.

A bracket 116 is rotatably mounted on the support shaft 106, and has a circular recess 118 defined in its lower surface with a ring 120 inserted in the circular recess 118. The bracket 116 has three pins 122 projecting downwardly into the reces 118 and fitted respectively in three holes 124 defined in the upper surface of the ring 120. Therefore, the ring 120 is fixedly positioned with respect to the bracket 116. The circular recess 118 has a groove 126 defined radially outwardly of the circumferential edge of the circular recess 118. The base 102 has an upwardly projecting stopper 128 which will abut against the ends of the groove 126 to prevent the rearview mirror assembly 100 from being forwardly and rearwardly tilted beyond a predetermined angular range.

Figure 10:
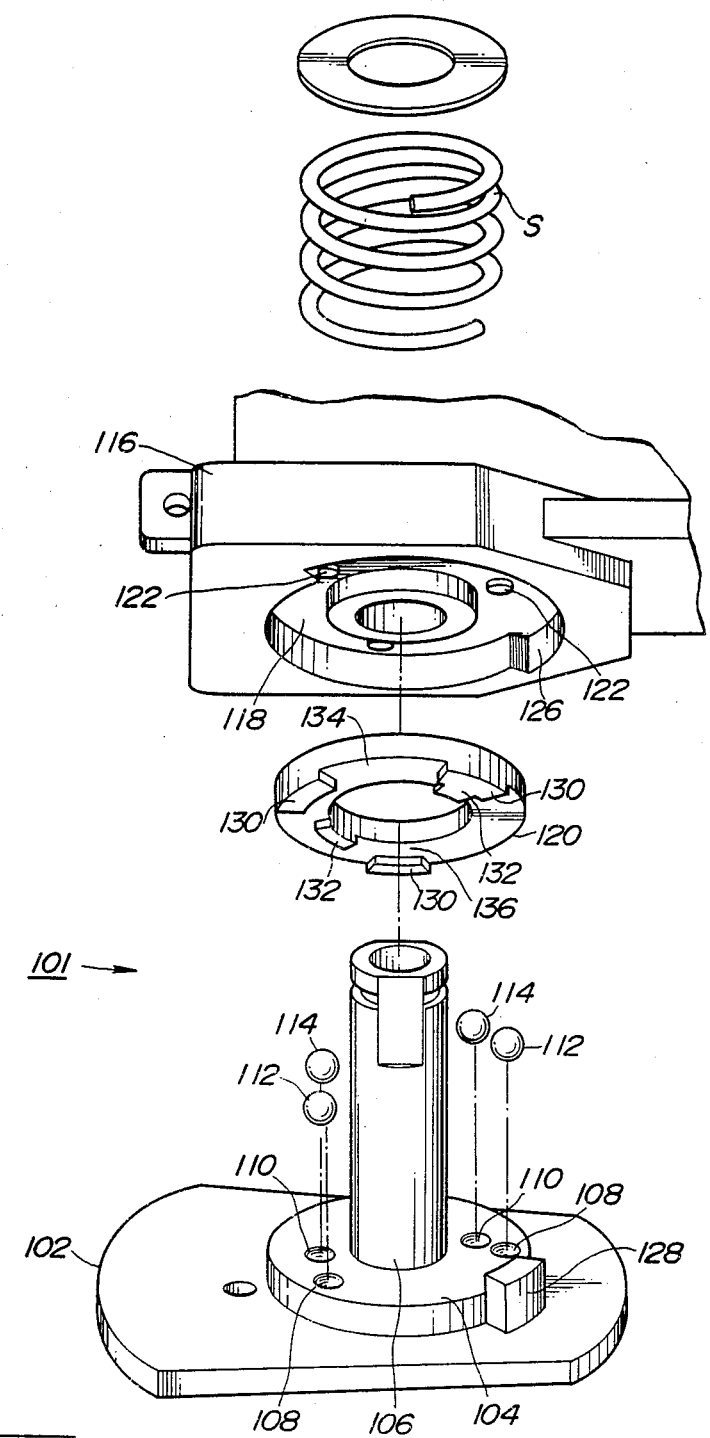
FIG. 10 is an exploded perspective view of a positioning means of the rearview mirror assembly of FIG. 9.
Figure 11:
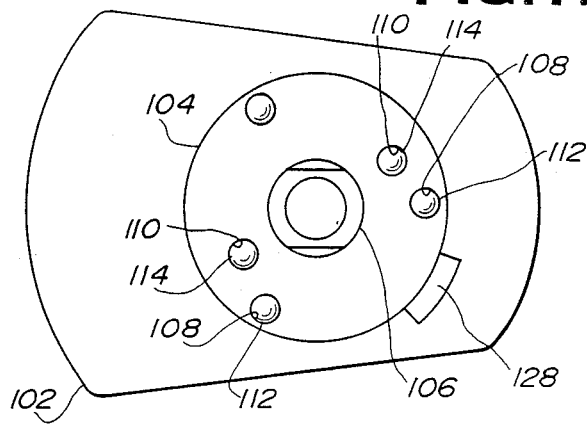
FIG. 11 is a plan view of a base shown in FIG. 10 with balls engaging therein.
Figure 12:
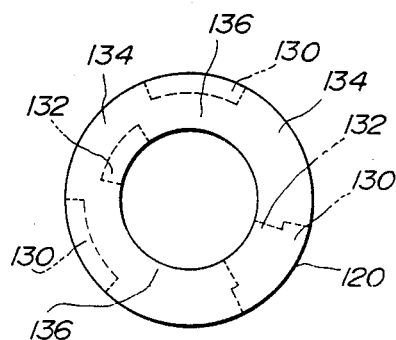
FIG. 12 is a plan view of a ring shown in FIG. 10.

As shown in FIGS. 10 and 12, the ring 120 has three lands 130 disposed on its lower surface along the outer edge thereof and circumferentially equally spaced at 120 degrees, and two lands 132 disposed on its lower surface along the inner edge thereof and positioned in diametrically opposite relation to each other. As a result, there is defined a recess 134 having a horizontal surface between adjacent two of the lands 130, and there is also defined a recess 136 having a horizontal surface between the lands 132 on each side thereof. One of the lands 130 and one of the lands 132 are of a unitary integral structure.

Figure 13:
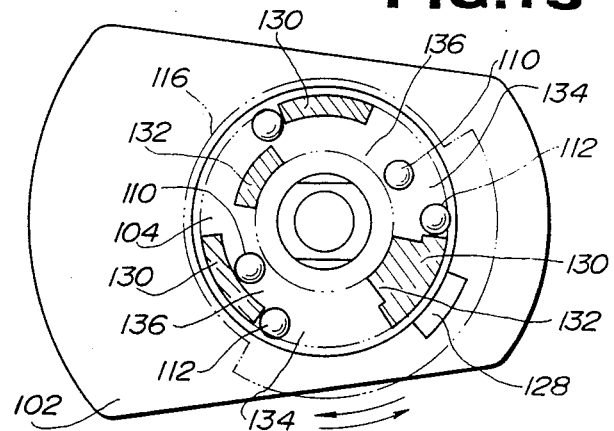
FIG. 13 is a plan view of a positioning means when the rearview mirror assembly is in a normal position.
Figure 15:
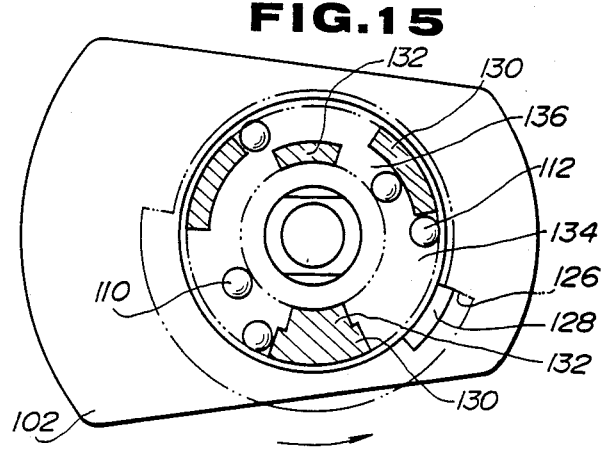
FIG. 15 is a plan view of the positioning means when the rearview mirror assembly is in a rearwardly tilted position.

When the rearview mirror assembly 100 is in the normal position N, the balls 112 engage respectively in the recesses 134 and are held against wall surfaces of the lands 130, as shown in FIGS. 13 and 14. When the motor M is energized to rotate the bracket 116 about 60 degrees clockwise in FIG. 13 (the ring 120 is moved to the left in FIGS. 14A and 14B) from the normal position N, the balls 112 are brought into abutment against wall surfaces of the next lands 130, as shown in FIG. 15, whereupon the rearview mirror assembly 100 reaches the rearwardly tilted position R. At this time, the stopper 128 engages one end of the groove 126, thus preventing the bracket 116 from further rotating. Since the recesses 134 in the ring 120 have horizontal surfaces, they move smoothly on the balls 112 without resistance. Accordingly, the motor M is not subjected to any excessive load. When the balls 112 abut against the wall surfaces of the next lands 130, a current change or voltage change in a driver circuit for the motor M is detected by a sensor Se whose signal is sent to a controller C to de-energize the motor M.

To return the rearview mirror assembly 100 from the rearwardly tilted position R to the normal position N, the motor M is energized again from the condition shown in FIG. 15 to rotate the ring 120 about 60 degrees counterclockwise (the ring 120 is moved to the right in FIGS. 16A and 16B) while the horizontal surfaces of the recesses 134 of the ring 120 are being held against the balls 112. At the time the balls 112 abut against the original lands 130 again, the rearview mirror assembly 100 reaches the normal position N, after which the motor M is de-energized by the controller C in the same manner as described above.

Figure 9:
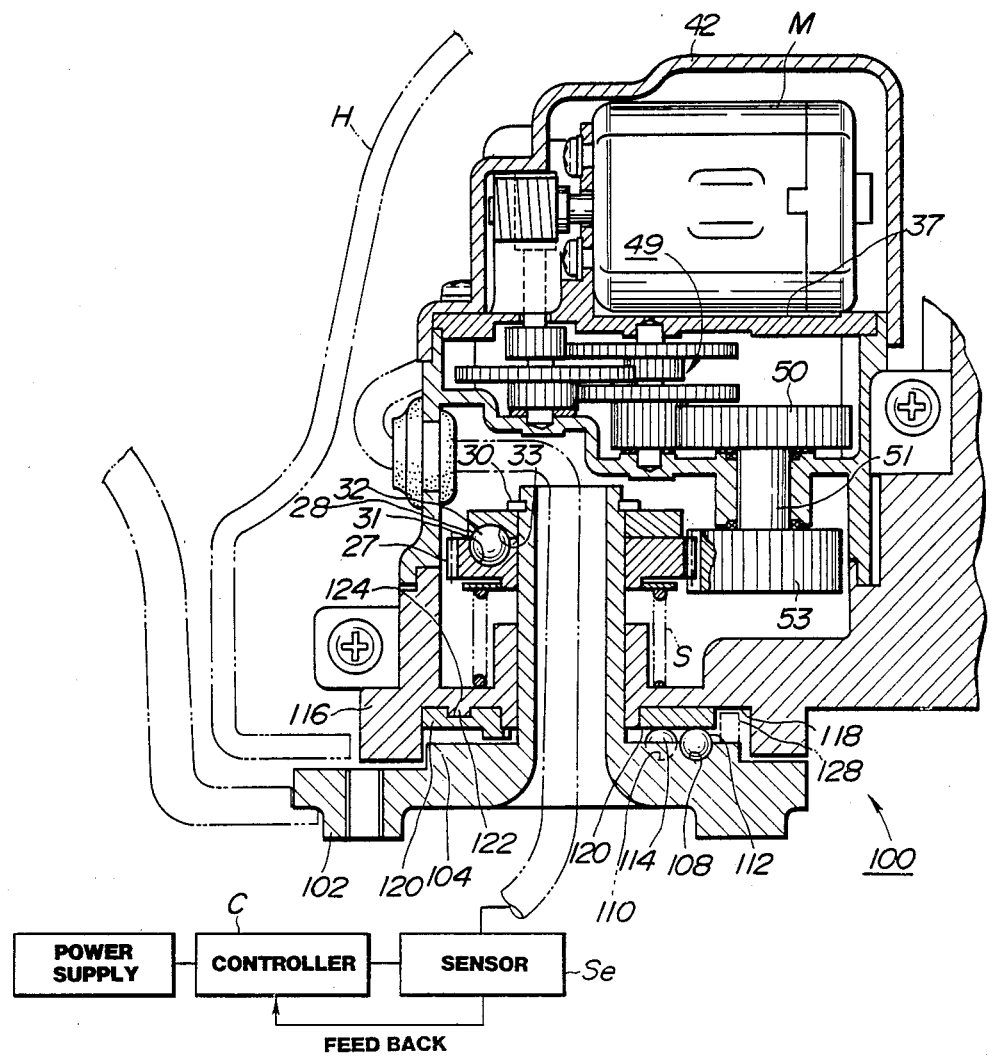
FIG. 9 is a fragmentary cross-sectional view of a rearview mirror assembly according to a second embodiment of the present invention.
Figure 17:
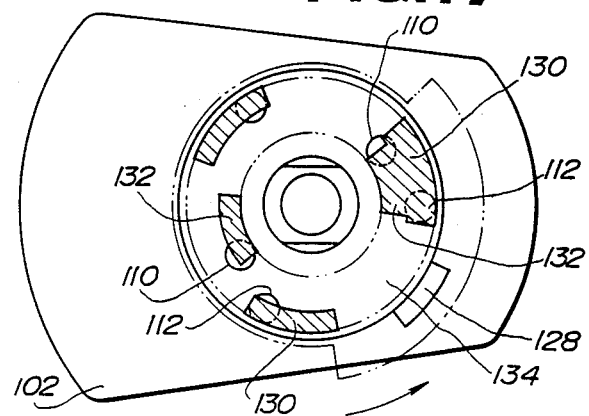
FIG. 17 is a plan view of the positioning means when the rearview mirror assembly is between the normal position and a forwardly tilted position.

When a relatively large external force is applied to the rearview mirror assembly 100 from behind, the ring 120 is rotated counterclockwise (the ring 120 is moved to the left in FIGS. 14A and 14B) from the position of FIG. 13. In the normal position N of the rearview mirror assembly 100, the lands 130 held against the balls, 112 ride onto the balls 112. Therefore, the ring 120 is slightly lifted off the base 102 against the bias of the spring S (FIG. 9). When the ring 120 is further rotated counterclockwise, the land 132 integral with one of the land 130 rides onto one of the inner balls 114 as shown in FIGS. 17 and 18A. When the rearview mirror assembly 100 is further tilted forwardly until finally it is turned about 80 degrees, it reaches the forwardly tilted position F shown FIG. 19 in which the balls 112 are positioned below the next recesses 134 as shown in FIG. 20B. However, inasmuch as the lands 132 keep riding on the balls 114, the horizontal surfaces of the recesses 134 do not abut against or engage the balls 112. At this time, the stopper 128 is held against one end of the groove 126 as shown in FIG. 19, so that the rearview mirror assembly 100 is prevented from being further turned beyond the forwardly tilted position F.

Figure 19:
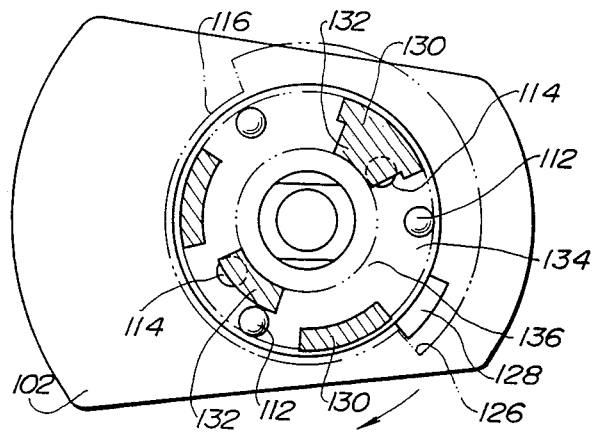
FIG. 19 is a plan view of the positioning means when the rearview mirror assembly is in the forwardly tilted position.
Figure 22:
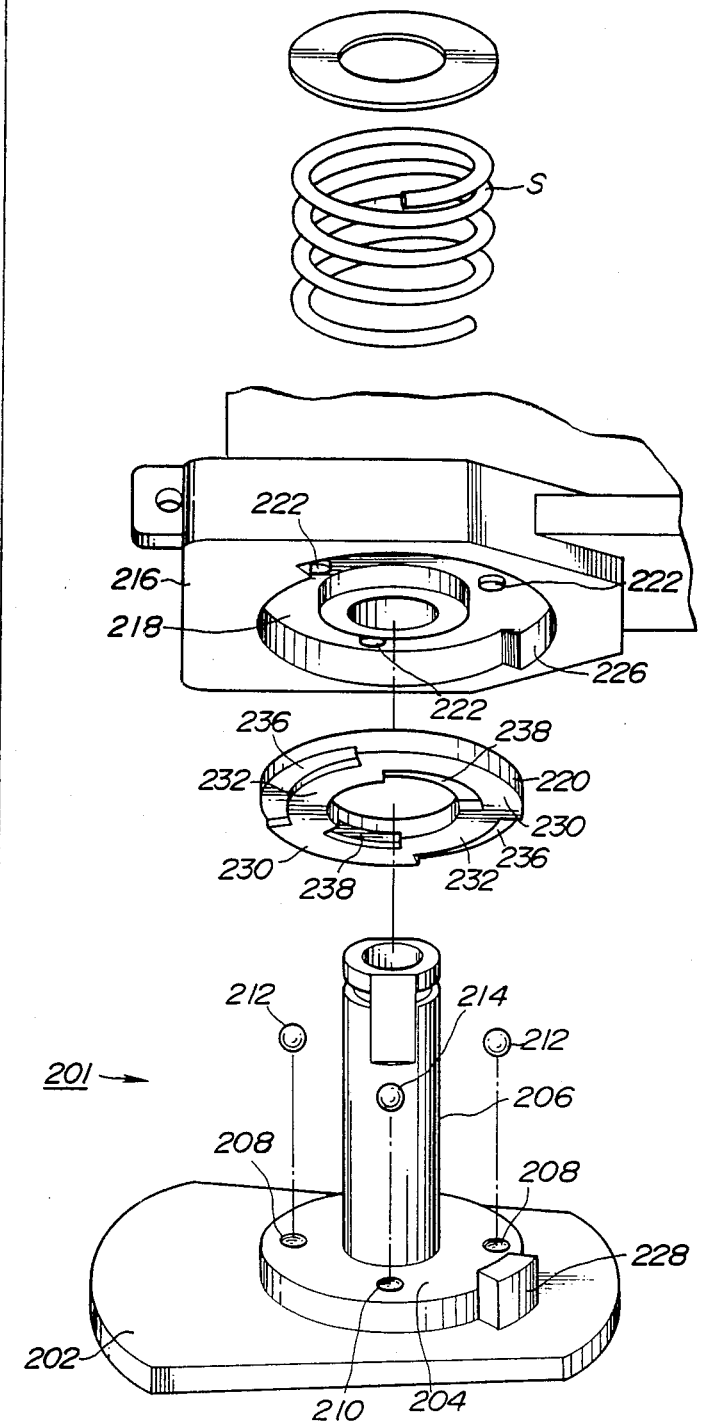
FIG. 22 is an exploded perspective view of a rearview mirror assembly according to a third embodiment of the present invention.

When the motor M is energized to rotate the bracket 116, i.e., the ring 120, clockwise from the position of FIG. 19, the lands 130 engage the balls 112 again. The lands 130 smoothly engage the balls 112 without substantial resistance at this time because the balls 114 engaging the inner lands 132 have kept the ring 120 at a constant height. Consequently, the motor M does not undergo an excessive load, and does not produce noise. Thereafter, the recesses 136 receive the balls 114, and then the recesses 134 receive the balls 112, whereupon the rearview mirror assembly 100 returns to the normal position N.

As shown in FIG. 21, a ring 120 may have lands 130, 132 with inclined wall surfaces for engagement with respective balls. This arrangement is advantageous in that the lands 130, 132 can ride onto the balls more easily.

It is also possible to form lands 130, 132 on the boss 104 of the base 102, to define recesses 108, 110 in the ring 120, and to press balls 112, 114 in the recesses 108, 110.

Figure 23:
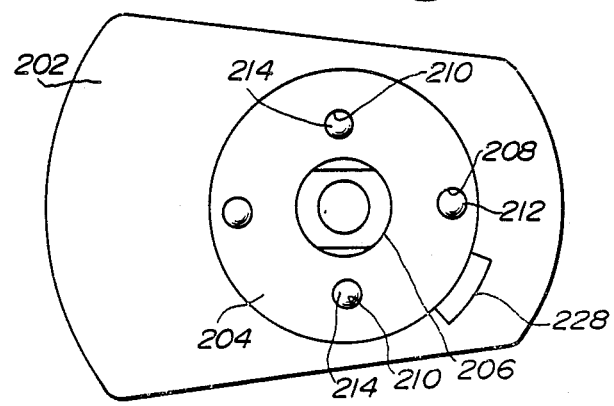
FIG. 23 is a plan view of a base shown in FIG. 22 with balls mounted thereon.

FIGS. 22 through 30 show a rearview mirror assembly in accordance with a third embodiment of the present invention. The rearview mirror assembly has a positioning means 201 including a base 202. The base 202 supports, integrally thereon, a circular boss 204 and a support shaft 206 vertically mounted centrally on the land 204, the support shaft 206 being in the form of a tubular fixed shaft. As shown in FIG. 23, the boss 204 has two diametrically opposite semispherical recesses 208 defined in its upper surface near the outer peripheral edge thereof, and two diametrically opposite semispherical recesses 210 defined in its upper surface radially inwardly of the recesses 208. These pairs of recesses 208, 210 are angularly displaced from each other by 90 degrees. Balls 212, 214 are partly received respectively in these recesses 208, 210.

A bracket 216 is rotatably mounted on the support shaft 206, and has a circular recess 218 defined in its lower surface with a ring 220 inserted in the circular recess 218. The bracket 216 has three pins 222 projecting downwardly into the recess 218 and fitted respectively in three holes (not shown) defined in the upper surface of the ring 220. Therefore, the ring 220 is fixedly positioned with respect to the bracket 216. The circular recess 218 has a groove 226 defined radially outwardly of the circumferential edge of the circular recess 218. The base 202 has an upwardly projeCting stopper 228 which will abut against the ends of the groove 226 to prevent the rearview mirror assembly from being forwardly and rearwardly tilted beyond a predetermined angular range.

Figure 24:
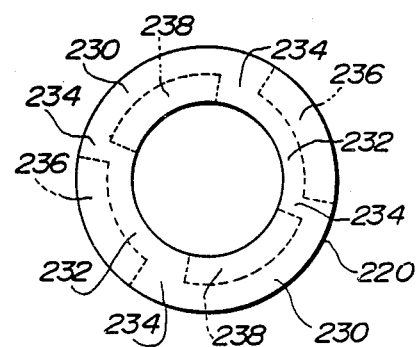
FIG. 24 is a plan view of a ring shown in FIG. 22.

As shown in FIG. 24, the ring 220 has two diametrically opposite lands 230 disposed on its lower surface along the outer edge thereof and and extending circumferentially by 90 degrees or more, and two diametrically opposite lands 232 disposed on its lower surface along the inner edge thereof and extending circumferentially by 90 degrees or more. The lands 230, 232 have adjacent ends joined to each other by radial lands 234. As a consequence, the two lands 230 and the two lands 232 extending therebetween jointly define recesses 236 radially outward of the lands 232, and the two lands 232 and the two lands 230 jointly define recesses 238 radially inward of the lands 230.

Figure 25:
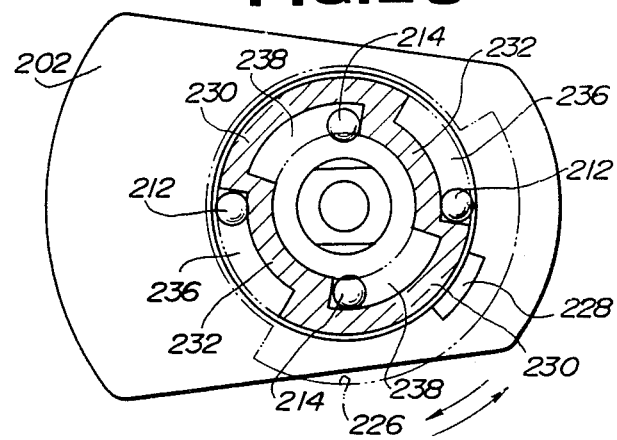
FIG. 25 is a plan view of a positioning means when the rearview mirror assembly is in a normal position.

When the rearview mirror assembly is in the normal position N, the balls 212 engage respectively in the recesses 236 and are held against wall surfaces of the lands 230, and the inner balls 214 are positioned in the respective recesses 238 as shown in FIG. 25. When the motor M is energized under remote control from within the automobile, the ring 220 is rotated about 60 degrees clockwise (the ring 120 is moved to the left in FIGS. 26A and 26B) until the rearview mirror assembly reaches the rearwardly tilted position R shown in FIG. 27 in which the balls 212 abut against wall surfaces of the adjacent lands 230. At this time, the stopper 228 engages one end of the groove 226, thus preventing the bracket 116 from further rotating. Since the recesses 236 in the ring 220 have horizontal surfaces, they move smoothly on the balls 212 without resistance. Accordingly, the motor M is not subjected to any excessive load. When the balls 212 abut against the wall surfaces of the next lands 230, a current change or voltage change in a driver circuit for the motor M is detected by a sensor (not shown) whose signal is sent to a controller (not shown) to de-energize the motor M.

Figure 27:
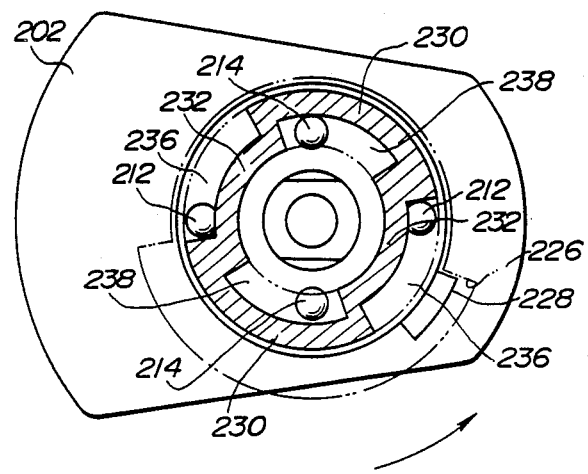
FIG. 27 is a plan view of the positioning means when the rearview mirror assembly is in a rearwardly tilted position.
Figure 29:
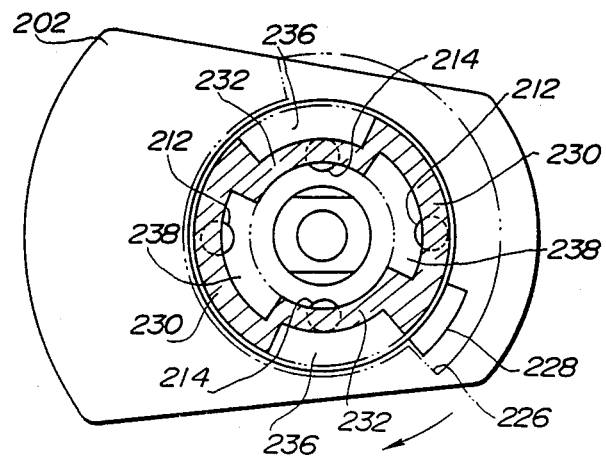
FIG. 29 is a plan view of the positioning means when the rearview mirror assembly is in a forwardly tilted position.
Figure 31:
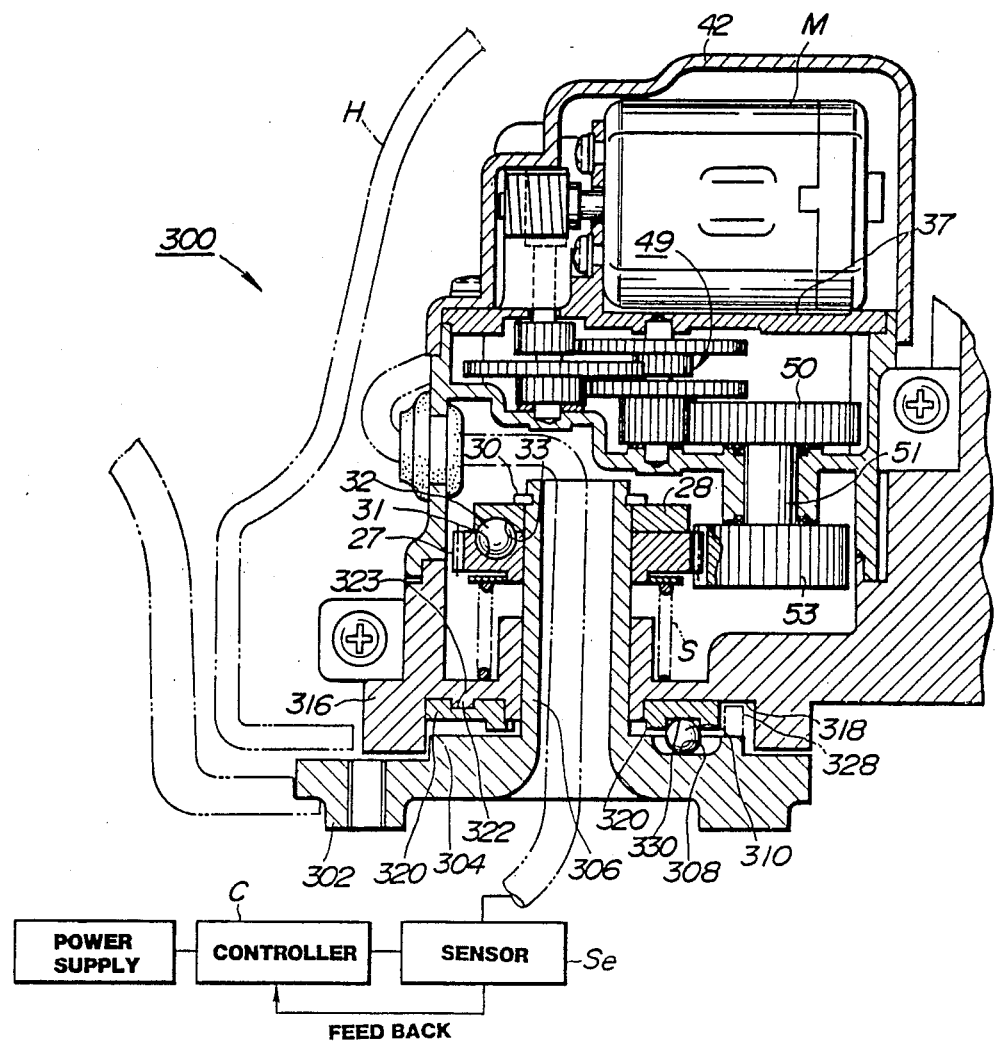
FIG. 31 is a fragmentary cross-sectional view of a rearview mirror assembly according to a fourth embodiment of the present invention.

To return the rearview mirror assembly from the rearwardly tilted position R to the normal position N, the motor M is energized again to rotate the ring 220 counterclockwise in FIG. 27 (the ring 220 is moved to the right in FIGS. 28A and 28B). When the ring 220 is turned about 60 degrees, the balls 212 return to the original position, i.e., abut against the wall surfaces of the lands 230 which were initially engaged by the balls 212. When such abutment is detected by the sensor in the manner described above, the motor M is automatically de-energized.

When a relatively large external force is applied to the rearview mirror assembly from behind, the ring 220 is rotated counterclockwise in FIG. 25 (the ring 220 is moved to the left in FIGS. 26A and 26B). Simultaneously with this rotation, the lands 230, 232 ride onto the balls 212, 214, respectively, and the ring 220 and the bracket 216 are displaced slightly upwardly. Upon rotation of the ring 220 about the support shaft 206 by about 80 degrees, the stopper 228 engages one end of the groove 226, thereby preventing the rearview mirror assembly from being further tilted forwardly. Until the rearview mirror mirror reaches the forwardly tilted position F, the ring 220 is turned about 80 degrees from the normal position N. Since the lands 230, 232 extend 90 degrees or more in the circumferential direction, however, the next recesses 236, 238 do not receive the balls 212, 214, respectively. Thus, when the rearview mirror assembly returns from the forwardly tilted position F to the normal position N, no resistance is applied thereto, and no undue load is imposed on the motor M.

Lands 230, 232 may be formed on the circular boss 204, and semispherical recesses 208, 210 may be defined in the ring 220.

Figure 32:
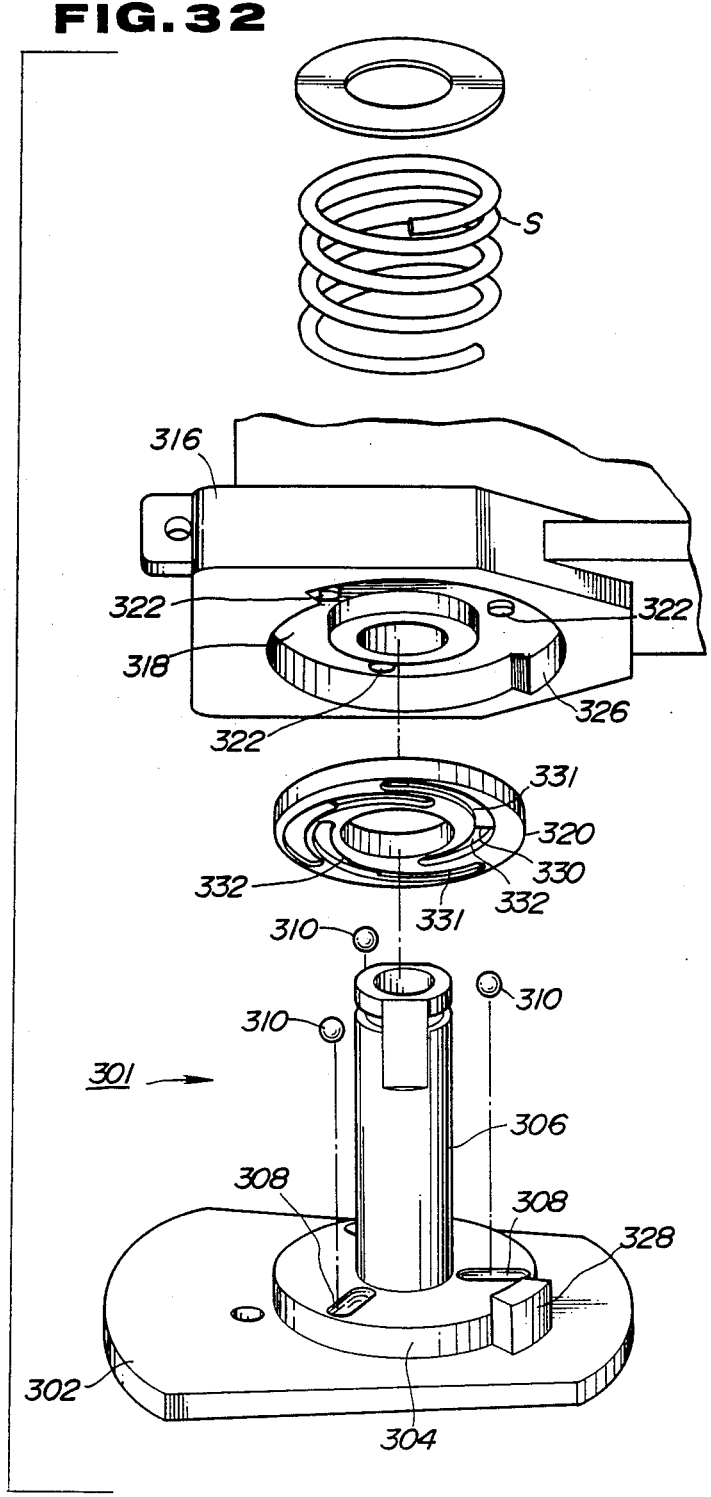
FIG. 32 is an exploded perspective view of a positioning means of the rearview mirror assembly of FIG. 31.
Figure 33:
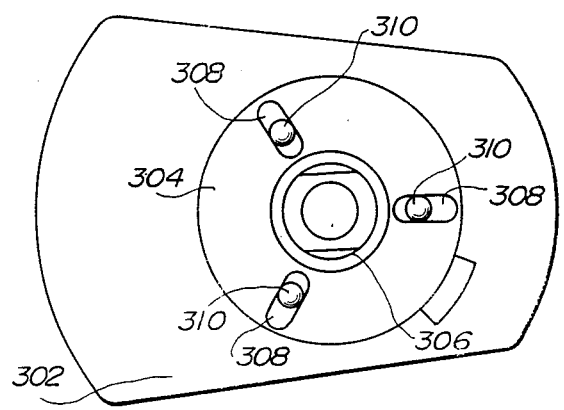
FIG. 33 is a plan view of a base shown in FIG. 32 with balls engaging therein.

FIGS. 31 through 41 illustrate a rearview mirror assembly 300 according to a fourth embodiment of the present invention. The rearview mirror assembly 300 has a positioning means 301 including a base 302. The base 302 supports, integrally thereon, a circular boss 304 and a support shaft 306 vertically mounted centrally on the boss 304, the support shaft 306 being in the form of a tubular fixed shaft. The boss 304 has three oblong recesses 308 defined radially in its upper surface and circumferentially equally spaced at 120 degrees, with balls 310 fitted respectively in the recesses 308, as shown in FIGS. 32 and 33.

A bracket 316 is rotatably mounted on the support shaft 306, and has a circular recess 318 defined in its lower surface with a ring 320 inserted in the circular recess 318. The bracket 316 has three pins 322 projecting downwardly into the recess 318 and fitted respectively in three holes 323 defined in the upper surface of the ring 320. Therefore, the ring 320 is fixedly positioned with respect to the bracket 316. The circular recess 318 has a groove 326 defined radially outwardly of the circumferential edge of the circular recess 318. The base 302 has an upwardly projecting stopper 328 which will abut against the ends of the groove 326 to prevent the rearview mirror assembly 300 from being forwardly and rearwardly tilted beyond a predetermined angular range.

Figure 34:
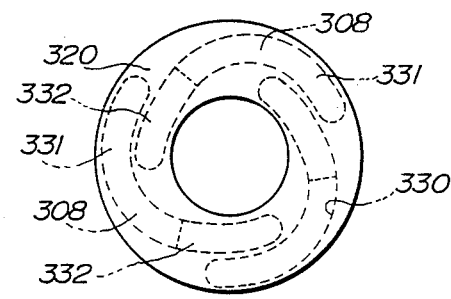
FIG. 34 is a plan view of a ring shown in FIG. 32.

As shown in FIG. 34, the ring 320 has three arcuate recesses 330 defined in its lower surface, each of the recesses 330 comprising a shallow recess section 331 and a deep recess section 332 which have different curvatures. When the rearview mirror assembly 300 is in the normal position N, the balls 310 engage in the deep recess sections 332 and abut against ends thereof near the shallow recess sections 331 (see FIG. 37).

Figure 35:
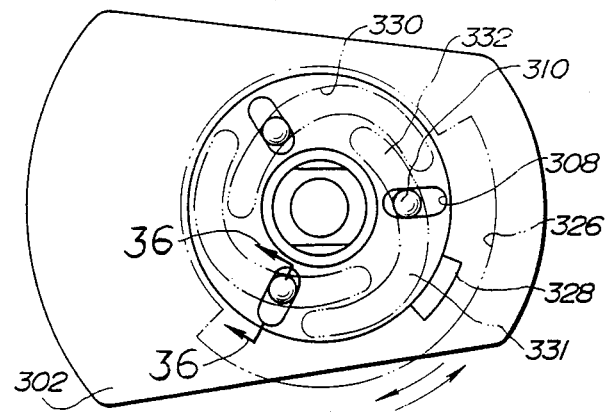
FIG. 35 is a plan view of a positioning means when the rearview mirror assembly is in a normal position.
Figure 36:
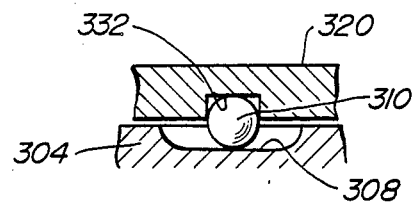
FIG. 36 is a cross-sectional view taken along line 36—36 of FIG. 35.
Figure 37:
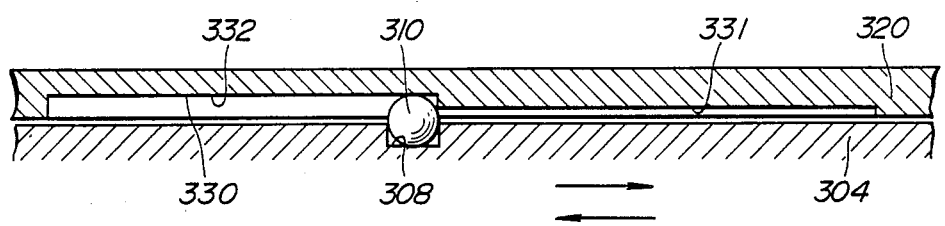
FIG. 37 is a developed view of the positioning means shown in FIG. 35.
Figure 39:
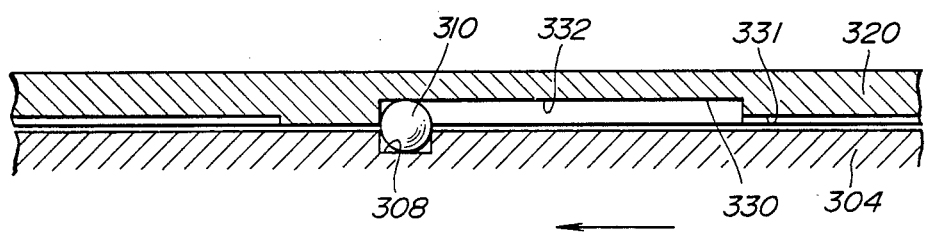
FIG. 39 is a developed view of the positioning means shown in FIG. 38.
Figure 38:
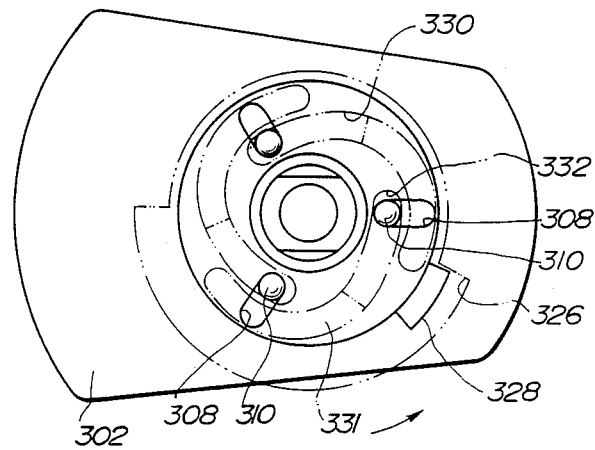
FIG. 38 is a plan view of the positioning means when the rearview mirror assembly is in a rearwardly tilted position.

To tilt the rearview mirror assembly 300 toward the rearwardly tilted position R, the motor M is energized under remote control from within the automobile to rotate the ring 320 about 60 degrees clockwise in FIG. 35 (the ring 320 is moved to the right in FIG. 37). During this rotation of the ring 320, the deep recess sections 332 of the recesses 330 move while receiving the balls 310 until finally the other ends of the deep recess sections 332 abut against the balls 310 (FIGS. 38 and 39). At this time, the balls 310 are moved slightly radially inwardly in the recesses 308. The rearview mirror assembly 300 is prevented from being further tilted rearwardly because the stopper 328 engages one end of the groove 326. A current change or voltage change in a driver circuit for the motor M due to the engagement of the stopper 328 with one end of the groove 326 is detected by a sensor Se whose signal is sent to a controller C to de-energize the motor M.

To return the rearview mirror assembly 300 from the rearwardly tilted position R to the normal position N, the motor M is energized again to rotate the ring 320 counterclockwise in FIG. 38 (the ring 320 is moved to the left in FIG. 39). When the ring 320 is angularly moved about 60 degrees, the ends of the deep recess sections 332 which were initially engaged by the balls 310 abut against the balls 310 again. Now, the balls 310 are moved slightly radially outwardly in the recesses 308. The abutment against the balls 310 is detected in the same manner as described above, and the motor M is automatically de-energized.

When a relatively large external force is applied to the rearview mirror assembly 300 from behind, the ring 320 is rotated counterclockwise in FIG. 35 (the ring 320 is moved to the left in FIG. 37). Simultaneously, the shallow recess sections 331 of the recesses 330 ride onto the balls 310. At this time, the balls 310 are moved slightly radially outwardly in the recesses 308. When the ring 320 has turned about the support shaft 306 by about 80 degrees, the stopper 328 engages one end of the groove 326, thereby preventing the rearview mirror assembly 300 from being further tilted forwardly (see FIG. 40).

Figure 41:
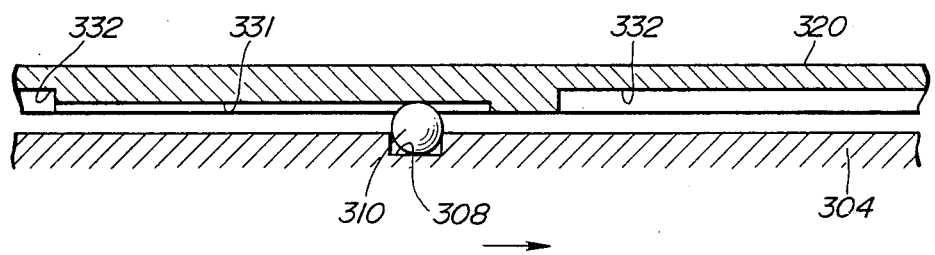
FIG. 41 is a developed view of the positioning means shown in FIG. 40.
Figure 40:
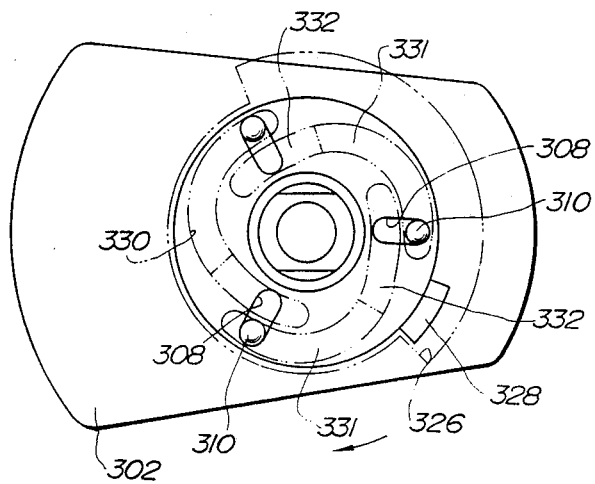
FIG. 40 is a plan view of the positioning means when the mirror assembly is in a forwardly tilted position.
Figure 42:
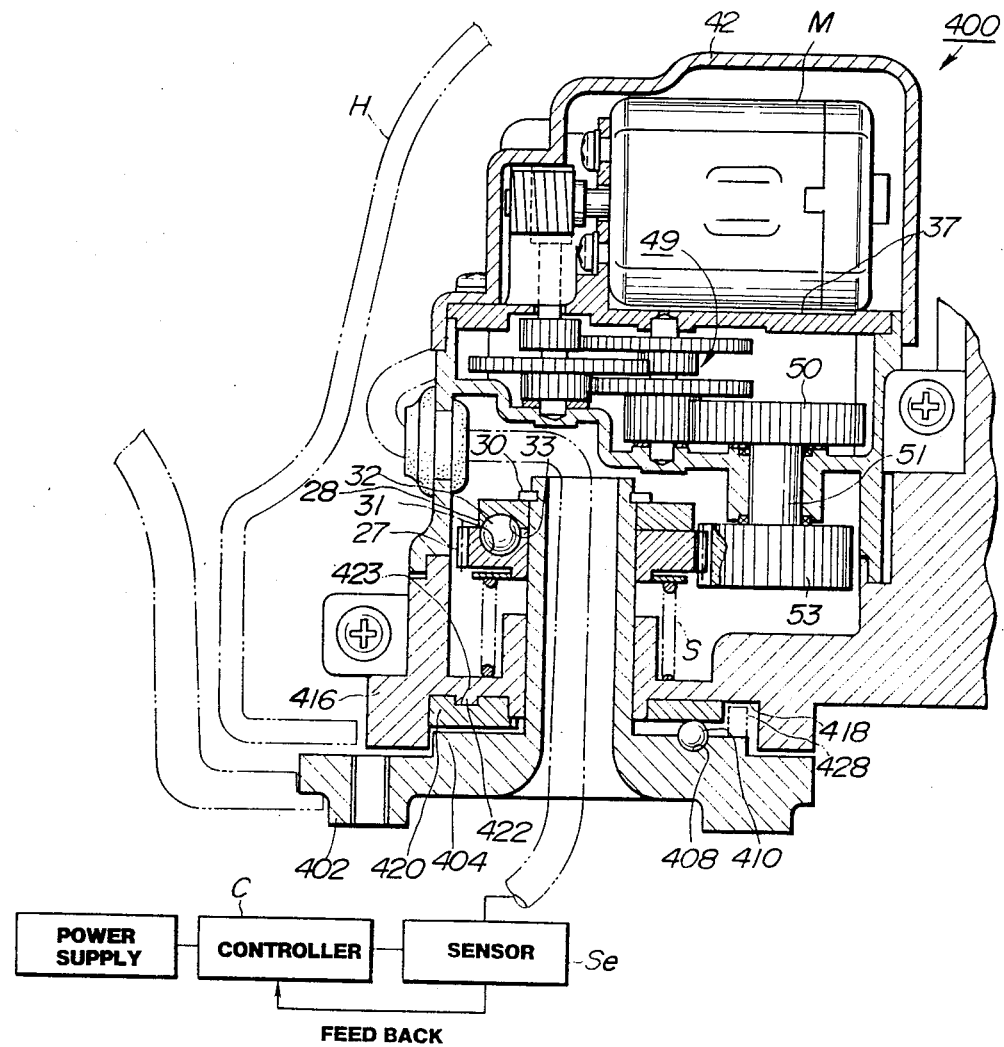
FIG. 42 is a fragmentary cross-sectional view of a rearview mirror assembly according to a fifth embodiment of the present invention.

To return the rearview mirror assembly 300 from the forwardly tilted position F to the normal position N, the ring 320 is rotated clockwise in FIG. 40 (the ring 320 is moved to the right in FIG. 41). At this time, the balls 310 are shifted from the shallow recess sections 331 into the deep recess sections 332, and are subjected to no resistance. As a result, the motor M does not undergo undue load. While the balls 310 are being thus moved, they are moved slightly radially inwardly in the recesses 308.

Three recesses 330 may be defined in the boss 304 of the base 302, and radial recesses 308 may be defined in the ring 320, with balls 310 engaging in these recesses.

Figure 43:
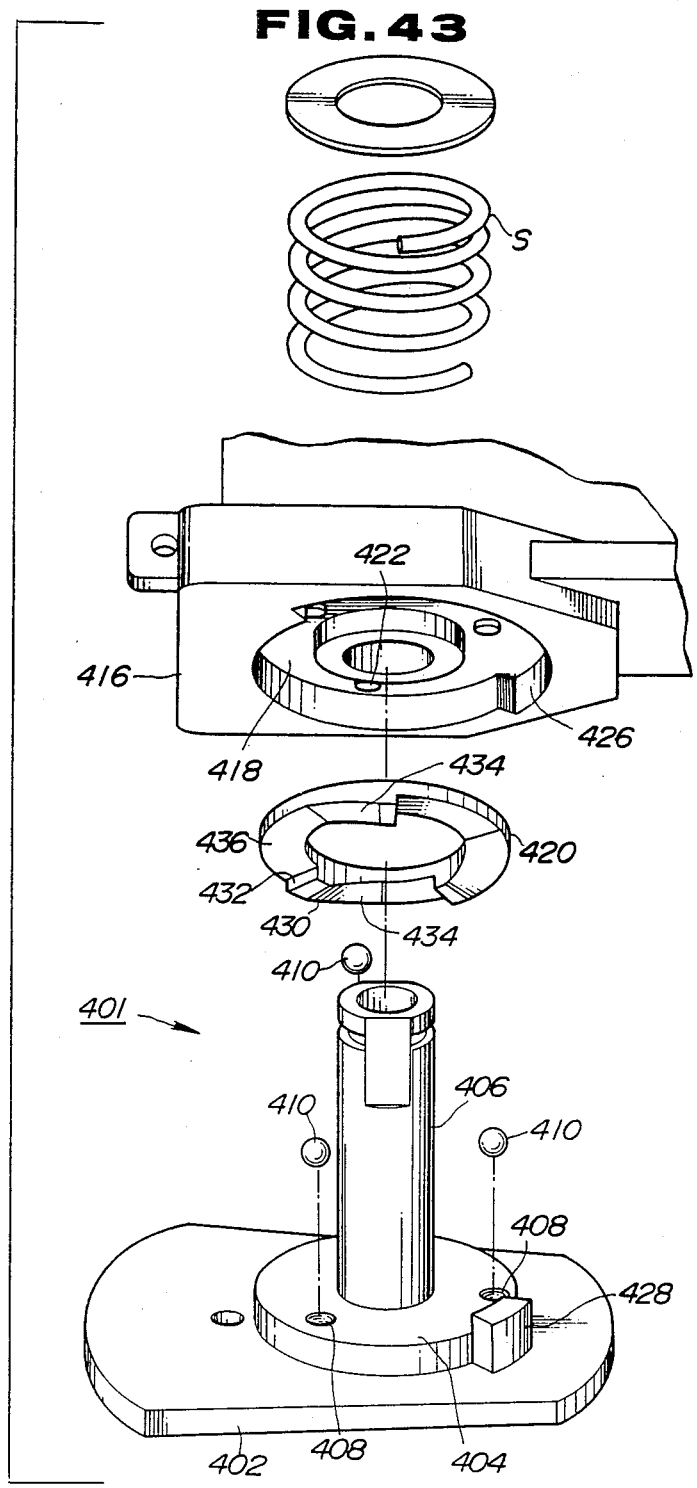
FIG. 43 is an exploded perspective view of a positioning means of the assembly in FIG. 42.
Figure 44:
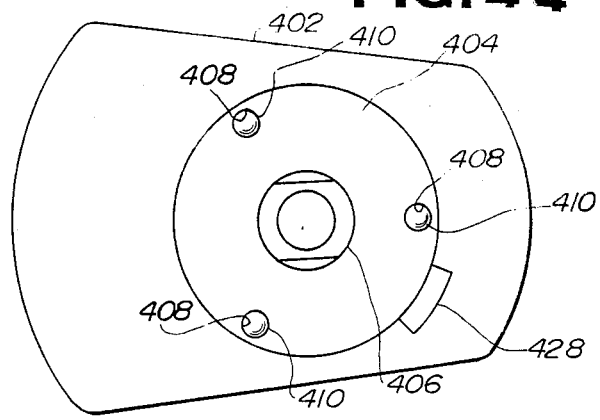
FIG. 44 is a plan view of a base shown in FIG. 43 with balls engaging therein.

FIGS. 42 through 51 illustrate a rearview mirror assembly 400 according to a fifth embodiment of the present invention. The rearview mirror assembly 400 has a positioning means 401 including a base 402. The base 402 supports, integrally thereon, a circular boss 404 and a support shaft 406 vertically mounted centrally on the boss 404, the support shaft 406 being in the form of a tubular fixed shaft. The boss 404 has three semispherical recesses 408 defined in its upper surface and circumferentially equally spaced at 120 degrees, with balls 410 fitted respectively in the recesses 408, as shown in FIGS. 43 and 44.

A bracket 416 is rotatably mounted on the support shaft 406, and has a circular recess 418 defined in its lower surface with a ring 420 inserted in the circular recess 418. The bracket 416 has three pins 422 projecting downwardly into the recess 418 and fitted respectively in three holes 423 defined in the upper surface of the ring 420. Therefore, the ring 420 is fixedly positioned with respect to the bracket 416. The circular recess 418 has a groove 426 defined radially outwardly of the circumferential edge of the circular recess 418. The base 402 has an upwardly projecting stopper 428 which will abut against the ends of the groove 426 to prevent the rearview mirror assembly 400 from being forwardly and rearwardly tilted beyond a predetermined angular range.

Figure 45:
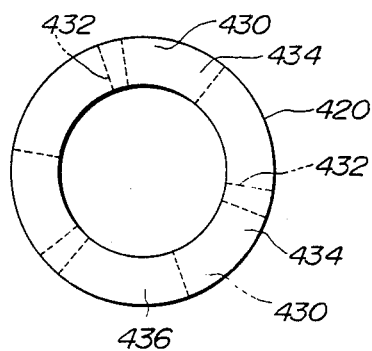
FIG. 45 is a plan view of a ring shown in FIG. 43.

As shown in FIGS. 43 and 45, the ring 420 has three raised steps 430 on its lower surface, each of the steps 430 comprising a vertical surface 432 and a slanted surface 434. A horizontal surface 436 extends between adjacent two of the steps 430. When the rearview mirror assembly 400 is in the normal position N, the horizontal surfaces 436 between the steps 430 engage the balls 410 and also engage the vertical surfaces 432 of the steps 430 (see FIG. 46).

Figure 46:
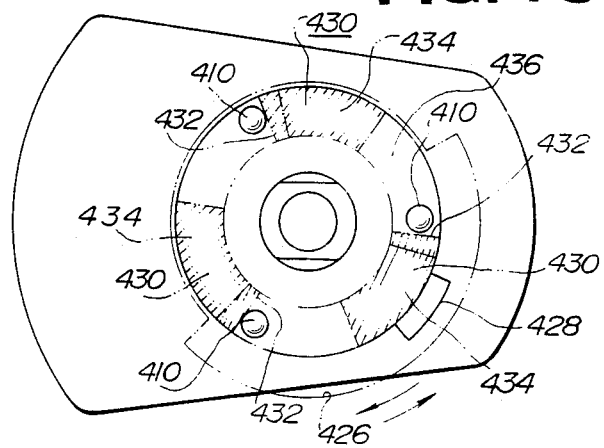
FIG. 46 is a plan view of a positioning means when the rearview mirror assembly is in a normal position.
Figure 47:
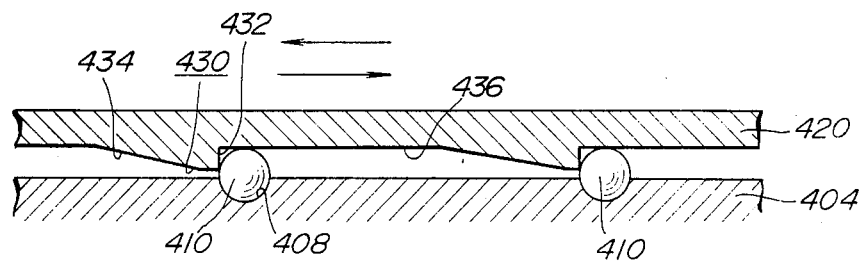
FIG. 47 is a developed cross-sectional view of the positioning means shown in FIG. 46.
Figure 49:
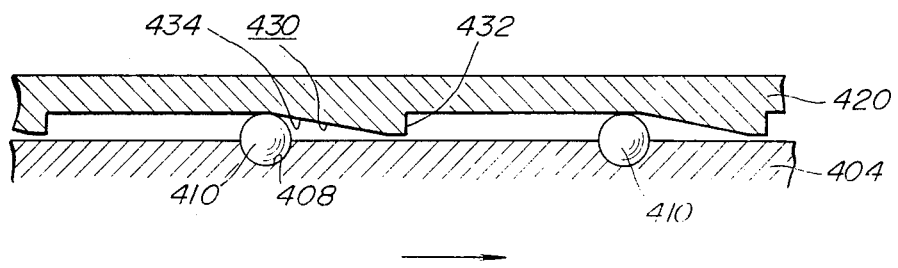
FIG. 49 is a developed cross-sectional view of the positioning means shown in FIG. 48.
Figure 48:
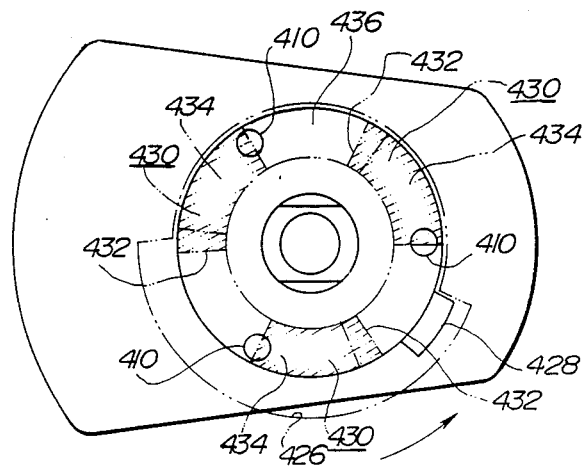
FIG. 48 is a plan view of the positioning means when the rearview mirror assembly is in a rearwardly tilted position.

To tilt the rearview mirror assembly 400 from the normal position N toward the rearwardly tilted position R, the motor M is energized under remote control from within the automobile to rotate the ring 420 about 60 degrees clockwise in FIG. 46 (the ring 420 is moved to the left in FIG. 47). During this rotation of the ring 420, the vertical surfaces 432 are spaced from the balls 410 until finally the horizontal surfaces 436 near ends of the slanted surfaces 434 of the adjacent steps 430 engage the balls 410 (FIGS. 48 and 49). At this time, the rearview mirror assembly 400 is prevented from being further tilted rearwardly because the stopper 428 engages one end of the groove 426. At this time, a current change or voltage change in a driver circuit for the motor M is detected by a sensor Se whose signal is sent to a controller C to de-energize the motor M.

To return the rearview mirror assembly 400 from the rearwardly tilted position R to the normal position N, the motor M is energized again to rotate the ring 420 counterclockwise in FIG. 48 (the ring 420 is moved to the right in FIG. 49). When the ring 420 is angularly moved about 60 degrees, the balls 410 abut against the initial vertical surfaces 432. The abutment against the balls 410 is detected in the same manner as described above, and the motor M is automatically de-energized.

Figure 51:
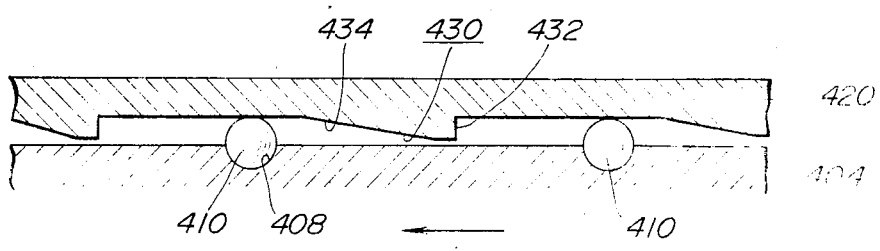
FIG. 51 is a developed cross-sectional view of the positioning means shown in FIG. 50.
Figure 50:
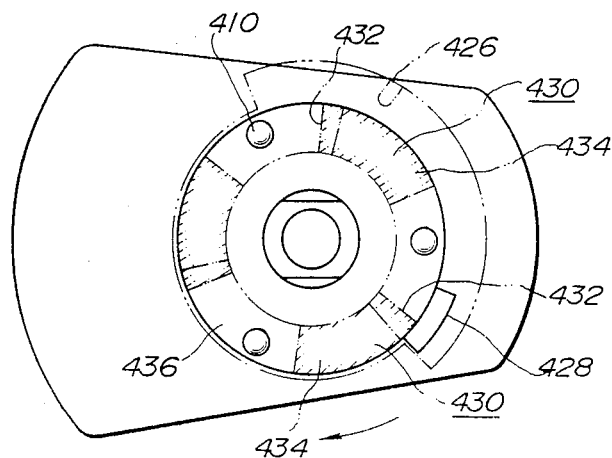
FIG. 50 is a plan view of the positioning means when the rearview mirror assembly is in a forwardly tilted position.

When a relatively large external force is applied to the rearview mirror assembly 400 from behind, the ring 420 is rotated counterclockwise in FIG. 46 (the ring 420 is moved to the right in FIG. 47). Simultaneously, the steps 430 run over the balls 410, which then engage the adjacent horizontal surfaces 436 (FIGS. 50 and 51). When the ring 420 has turned about the support shaft 406 by about 80 degrees, the stopper 428 engages one end of the groove 426, thereby preventing the rearview mirror assembly 400 from being further tilted forwardly.

To return the rearview mirror assembly 400 from the forwardly tilted position F to the normal position N, the ring 420 is rotated clockwise in FIG. 50 (the ring 420 is moved to the left in FIG. 51). At this time, the steps 430 run over the balls 410. Since the slanted surfaces 434 engage the balls 410, however, the balls 410 are subjected to reduced resistance, and the motor M does not undergo undue load.

Steps 430 may be formed on the boss 404 of the base 402, and semispherical recesses 408 may be defined in the ring 420, with balls 410 engaging in these recesses.

Figure 52:
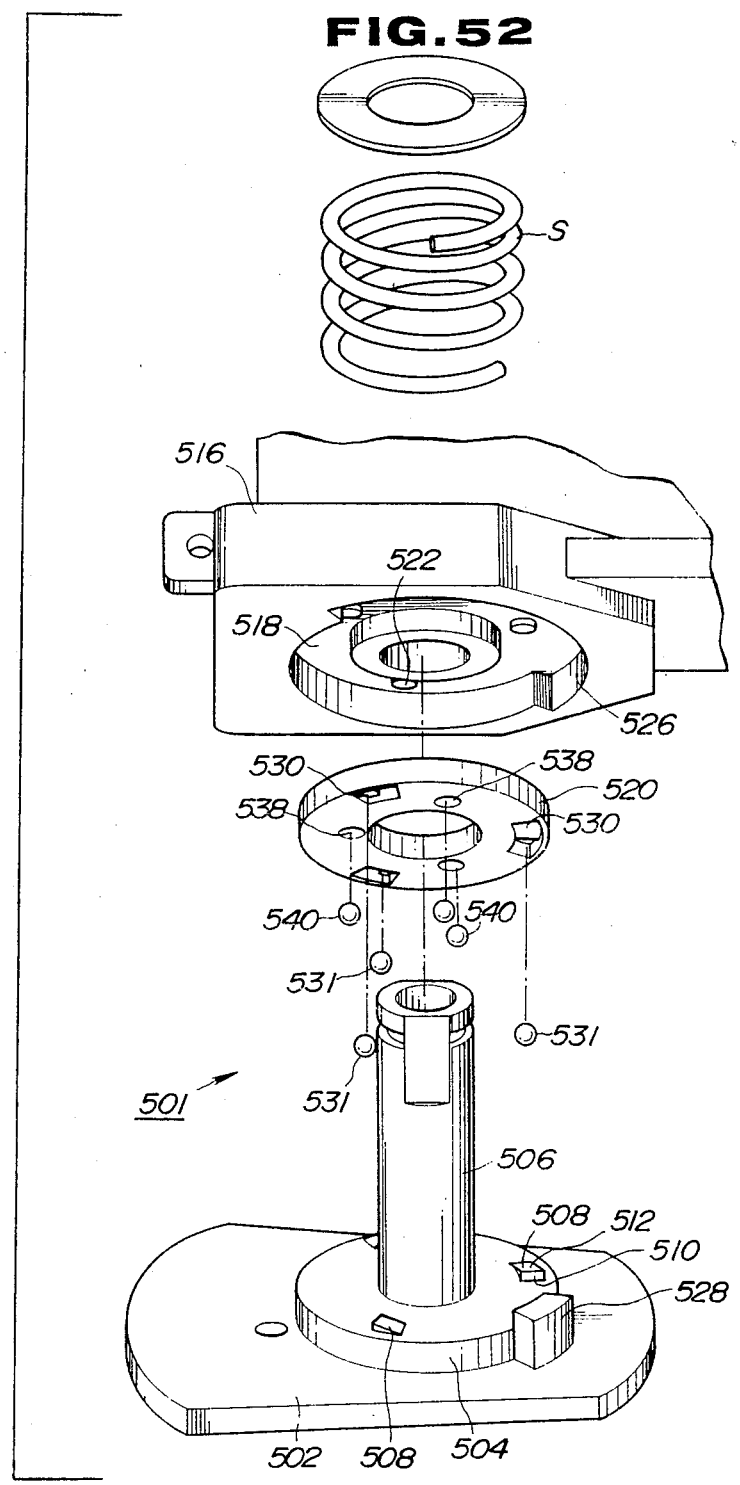
FIG. 52 is an exploded perspective view of a rearview mirror assembly according to a sixth embodiment of the present invention.
Figure 53:
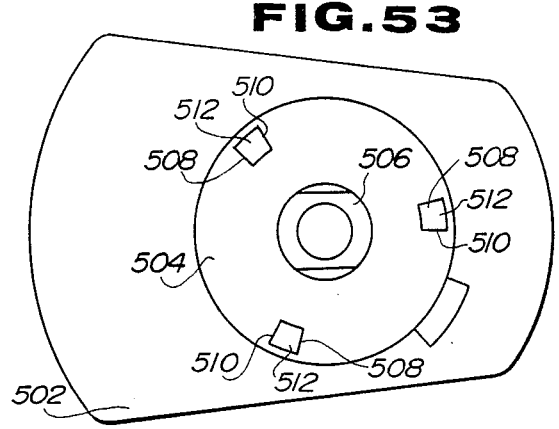
FIG. 53 is a plan view of a base shown in FIG. 52 with balls engaging therein.
Figure 54:
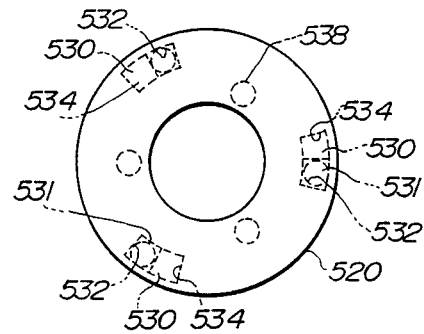
FIG. 54 is a plan view of a ring shown in FIG. 52.

FIGS. 52 through 61 illustrate a rearview mirror assembly according to a sixth embodiment of the present invention. The rearview mirror assembly has a positioning means 501 including a base 502. The base 502 supports, integrally thereon, a circular boss 504 and a support shaft 506 vertically mounted centrally on the boss 504, the support shaft 506 being in the form of a tubular fixed shaft. The boss 504 has three raised steps 508 defined on its upper surface and circumferentially equally spaced at 120 degrees, each of the steps 508 comprising a vertical surface 510 and a slanted surface 512 as shown in FIGS. 52 and 53.

A bracket 516 is rotatably mounted on the support shaft 506, and has a circular recess 518 defined in its lower surface with a ring 520 inserted in the circular recess 518. The bracket 516 has three pins 522 projecting downwardly into the recess 518 and fitted respectively in three holes (not shown) defined in the upper surface of the ring 520. Therefore, the ring 520 is fixedly positioned with respect to the bracket 516. The circular recess 518 has a groove 526 defined radially outwardly of the circumferential edge of the circular recess 518. The base 502 has an upwardly projecting stopper 528 which will abut against the ends of the groove 526 to prevent the rearview mirror assembly from being forwardly and rearwardly tilted beyond a predetermined angular range.

As shown in FIG. 52, the ring 520 has three recesses 530 defined in its lower surface near the outer peripheral edge thereof and circumferentially spaced at 120 degrees, with balls 531 fitted respectively in the recesses 530. Each of the recesses 530 comprises a shallow recess section 532 and a deep recess section 534 (see FIG. 61). The ring 520 also has three semispherical recesses 538 defined in the lower surface near the inner peripheral edge thereof and circumferentially spaced at 120 degrees, with balls 540 fitted respectively in the recesses 538. When the rearview mirror assembly is in the normal position N, the balls 531 engage in the shallow recess sections 532 and also engage the vertical surfaces 510 of the steps 508 as shown in FIG. 55.

Figure 55:
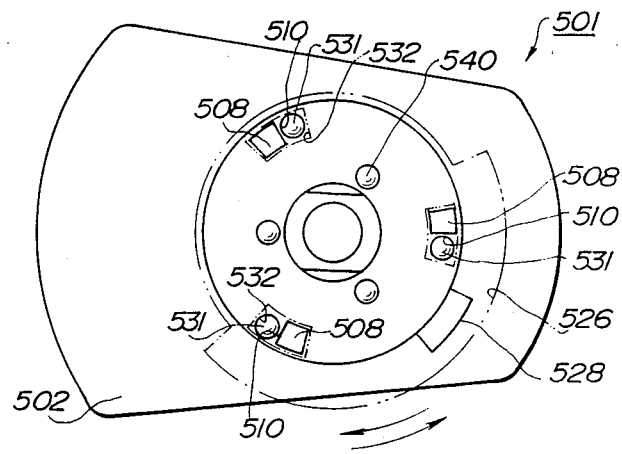
FIG. 55 is a plan view of a positioning means when the rearview mirror assembly is in a normal position.
Figure 56:
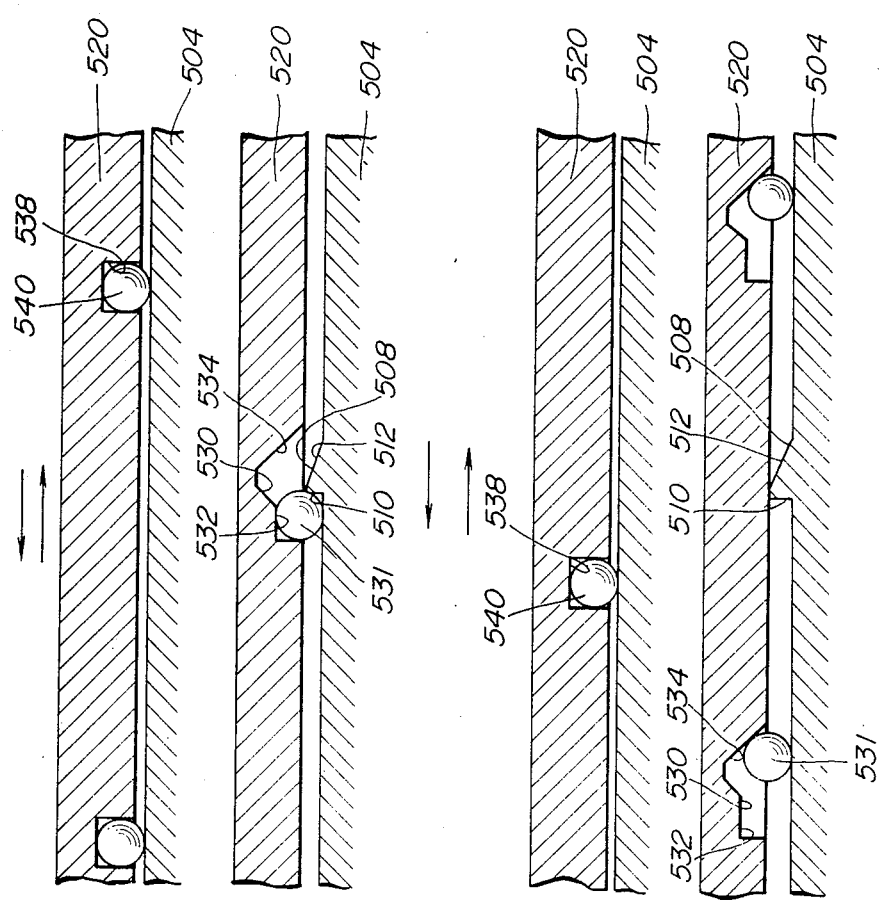
FIGS. 56A and 56B are developed cross-sectional views of the positioning means shown in FIG. 55.

To tilt the rearview mirror assembly from the normal position N toward the rearwardly tilted position R, the motor M is energized under remote control from within the automobile to rotate the ring 520 about 60 degrees clockwise in FIG. 55 (the ring 520 is moved to the left in FIGS. 56A and 56B). The ring 520 is stopped when the stopper 528 engages one end of the groove 526. With the rearview mirror assembly in the rearwardly tilted position R, the balls 531 are positioned in the deep recess sections 534 of the recesses 530. At this time, a current change or voltage change in a driver circuit for the motor M due to such engagement of the stopper 528 with one end of the groove 526 is detected by a sensor (not shown) whose signal is sent to a controller (not shown) to de-energize the motor M. The balls 540 prevent the ring 520 from moving downwardly when the balls 531 move into the deep recess sections 534 of the recesses 530.

Figure 57:
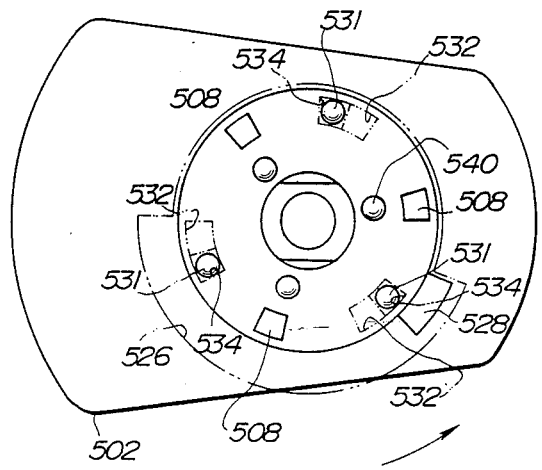
FIG. 57 is a plan view of the positioning means when the rearview mirror assembly is in a rearwardly tilted position.

To return the rearview mirror assembly from the rearwardly tilted position R to the normal position N, the motor M is energized again to rotate the ring 520 counterclockwise in FIG. 57 (the ring 520 is moved to the right in FIGS. 58A and 58B). When the ring 520 is angularly moved about 60 degrees, the balls 510 are displaced out of the deep recess sections 534 into the shallow recess sections 532, and moved until finally they abut against the vertical surfaces 510 of the steps 508. The abutment against the vertical surfaces 510 is detected in the same manner as described above, and the motor M is automatically de-energized.

When a relatively large external force is applied to the rearview mirror assembly from behind, the ring 520 is rotated counterclockwise in FIG. 55 (the ring 520 is moved to the right in FIGS. 56A and 56B). Simultaneously, the balls 531 ride onto the steps 508 and move in the same manner as before the balls 531 ride onto the steps 508. When the ring 520 has turned about the support shaft 506 by about 80 degrees, the stopper 528 engages one end of the groove 526, thereby preventing the rearview mirror assembly from being further tilted forwardly.

Figure 59:
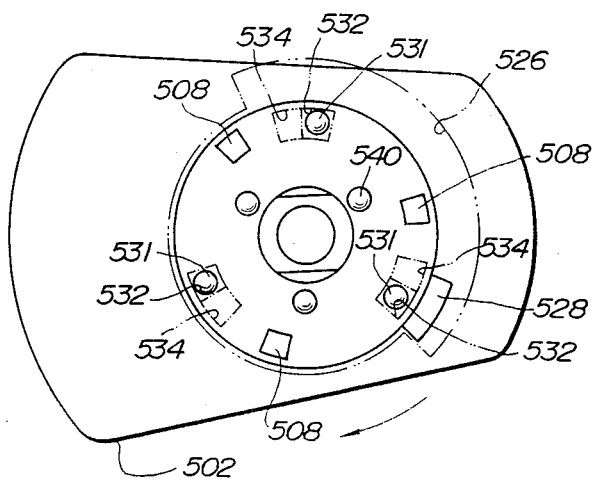
FIG. 59 is a plan view of the positioning means when the rearview mirror assembly is in a forwardly tilted position.

To return the rearview mirror assembly from the forwardly tilted position F to the normal position N, the ring 520 is rotated clockwise in FIG. 59 (the ring 520 is moved to the left in FIGS. 60A and 60B). At this time, the balls 531 run over the steps 508. Since the balls 531 move along the slanted surfaces 512, however, the balls 531 are subjected to reduced resistance. When the balls 531 reach the apexes of the steps 508, as shown in FIG. 61, the bracket 516 does not move upwardly since the upward displacement of the balls 531 is absorbed by the space provided by the deep recess sections 534.

Recesses 530 may be defined in the base 504 near the outer peripheral edge thereof, with balls 531 fitted in the recesses 530, and semispherical recesses 538 may be defined in the base 504 near the inner peripheral edge thereof, with balls 540 fitted in the recesses 538. Steps 508 may be formed on the lower surface of the ring 520.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A rearview mirror assembly for an automobile, comprising:
   a base adapted to be mounted on an automobile body and having a support shaft;
   a rotatable member mounted on said base and having a mirror and an actuator, said rotatable member being angularly movable about said support shaft between an normal viewing position and a rearwardly tilted position by said actuator;
   means for positioning said rotatable member in said normal position and said rearwardly tilted position one at a time, and
   said positioning means comprising a projection a recess having a surface for engaging said projection and biasing means for normally urging at least one of said projection and said surface of said recess into contact with the other, said projection and said recess being movable relative to each other when said rotatable member is angularly moved, and said surface of said recess comprising a surface which extends uniformly horizontally while said projection is being moved between one end of said recess and another end of said recess in response to angular movement of said rotatable member between said normal position and said rearwardly tilted position.

2. A rearview mirror assembly according to claim 1, wherein said projection comprises a plurality of balls partly fitted respectively in a plurality of semispherical recesses defined in a surface of one of said base and said rotatable member, said recess of said positioning means being defined in the other of said base and said rotatable member.

3. A rearview mirror assembly according to claim 1, wherein said projection comprises a plurality of balls partly fitted respectively in a plurality of oblomg recesses defined radially in one of said base and said rotatable member, said recess of said positioning means comprising curved recesses defined in the other of said base and said rotatable member, each of said curved recesses comprising a shallow recess section and a deep recess section, so that when said rotatable member is angularly moved between said normal position and said rearwardly tilted position, each of said balls moves between opposite ends of one of said deep recess sections, and when said rotatable member is angularly moved from a forwardly tilted position back to said normal position, each of said balls moves from one of said shallow recess sections to one of said deep recess sections.

4. A rearview mirror assembly according to claim 1, wherein said projection comprises a plurality of balls partly fitted respectively in a plurality of semispherical recesses defined in one of said base and said rotatable member, said recess of said positioning means comprising a plurality of recesses defined between a plurality of raised steps disposed on the other of said base and said rotatable member and having respective slanted surfaces, so that when said rotatable member is angularly moved between said normal position and said rearwardly tilted position, each of said balls moves between opposite ends of one of said recesses, and when said rotatable member is angularly moved from a forwardly tilted position back to said normal position, each of said balls moves over the slanted surface of one of the steps and engages in one of said recesses.

5. A rearview mirror assembly according to claim 1, wherein said projection comprises a plurality of balls partly fitted respectively in a plurality of first circumferentially equally spaced recesses defined in one of said base and said rotatable member near an outer peripheral edge thereof, and a plurality of second circumferentially equally spaced recesses defined radially inwardly of said first recesses, the other of said base and said rotatable member having a plurality of first lands disposed near an outer peripheral edge thereof and a plurality of second lands disposed radially inwardly of said first lands, said recess of said positioning means comprising a plurality of recesses defined between said first lands, so that when said rotatable member is angularly moved between said normal position and said rearwardly tilted position, each of the balls fitted in said first recesses moves between the recesses of said positioning means, and when said rotatable member is angularly moved from said normal position to a forwardly tilted position, each of the balls fitted in said second recesses ride onto said second lands.

6. A rearview mirror assembly according to claim 1, further including means for detecting a change in a load imposed on said actuator to inactivate the actuator when said projection of said positioning means is displaced from said one end of said recess and reaches said other end thereof.

7. A rearview mirror assembly for an automobile, comprising:
   a base adapted to be mounted on an automobile body and having a substantially vertical support shaft;
   a rotatable member mounted on said base and having a mirror and an actuator, said rotatable member being angularly movable about said support shaft between a normal viewing position and a rearwardly tilted position by said actuator;
   means for positioning said rotatable member in said normal position and said rearwardly tilted position one at a time; and
   said positioning means comprising a projection, a recess having a surface for engaging said projection and biasing means for normally urging at least one of said projection and said surface of said recess into contact with the other, said projection and said recess being movable relative to each other when said rotatable member is angularly moved, and said surface of said recess comprising a flat surface which extends uniformly perpendicularly to said support shaft while said projection is being moved from one end of said recess to another end of said recess in response to angular movement of said rotatable member between said normal position and said rearwardly tilted position.

8. A rearview mirror assembly according to claim 7, further including means for detecting a change in a load imposed on said actuator to inactivate the actuator when said projection of said positioning means is displaced from said one end of said recess and reaches said other end thereof.

9. A rearview mirror assembly for an automobile, comprising:

a base adapted to be mounted on an automobile body and having a support shaft;

a rotatable member mounted on said base and having a mirror and an actuator, said rotatable member being angularly movable about said support shaft between a normal viewing position and a rearwardly tilted position by said actuator;

means for positioning said rotatable member in said normal position and said rearwardly tilted position one at a time; and said positioning means comprising a projection, a recess having a surface for engaging said projection and biasing means for normally urging at least one of said projection and said surface of said recess into contact with the other, said projection and said recess being movable relative to each other when said rotatable member is angularly moved, and said surface of said recess extending uniformly at a constant height while said projection is being moved from one end of said recess to another end of said recess in response to angular movement of said rotatable member between said normal position and said rearwardly tilted position.

10. A rearview mirror assembly according to claim 9, further including means for detecting a change in a load imposed on said actuator to inactivate the actuator when said projection of said positioning means is displaced from said one end of said recess and reaches said other end thereof.

* * * * *

UNITED STATES PATENT AND TRADEMARK OFFICE
CERTIFICATE OF CORRECTION

PATENT NO. : 4,981,349

DATED : January 1, 1991

INVENTOR(S) : Tamiya et al.

It is certified that error appears in the above-identified patent and that said Letters Patent is hereby corrected as shown below:

Column 2, line 1, after "horizontally" insert —while—;
         line 28, change "out" to —cut—;
         line 29, change "vie" to —view—.

Column 7, line 14, change "movaport" to —movable contact 67d on its distal end. The arms 67a, 67b support—.

Column 8, line 19, change "reces" to —recess—.

Column 9, line 12, after "balls" delete the comma;
         line 17, change "land" to —lands—;
         line 21, change "shown" to —as shown in—.

Column 10, line 9, change "projeCting" to —projecting—;
         line 16, delete "and" (second occurrence).

Column 11, line 3, delete "mirror" (second occurrence).

Column 12, line 68, change the semicolon to a period.

Column 15, line 33 (Claim 1, line 8), change "an" to —a—;
         line 38 (Claim 1, line 13), after "projection" insert a comma;
         line 61 (Claim 3, line 3), change "oblomg" to —oblong—.

Signed and Sealed this

Twenty-fifth Day of August, 1992

*Attest:*

DOUGLAS B. COMER

*Attesting Officer*      *Acting Commissioner of Patents and Trademarks*